United States Patent [19]

Takeshita et al.

[11] Patent Number: 5,033,575
[45] Date of Patent: Jul. 23, 1991

[54] ELECTRIC CONTROL APPARATUS FOR TRANSFER DEVICE IN PART-TIME FOUR-WHEEL DRIVE VEHICLE

[75] Inventors: Keiji Takeshita; Hideo Hamano; Hideyuki Iwata; Masahiko Noba, all of Toyota, Japan

[73] Assignee: Toyota Jidosha Kabushiki Kaisha, Toyota, Japan

[21] Appl. No.: 503,038

[22] Filed: Apr. 2, 1990

[30] Foreign Application Priority Data

Mar. 31, 1989 [JP] Japan .................. 1-38370[U]
May 1, 1989 [JP] Japan .................. 1-51926[U]

[51] Int. Cl.$^5$ .................................. B60K 17/34
[52] U.S. Cl. ............................. 180/249; 180/233; 180/247
[58] Field of Search .............. 180/233, 247, 248, 249

[56] References Cited

U.S. PATENT DOCUMENTS

| | | | |
|---|---|---|---|
| 4,452,274 | 6/1984 | Haga et al. ............. | 137/625.22 |
| 4,539,447 | 9/1985 | Mizutani et al. . | |
| 4,771,852 | 9/1988 | Nishikawa et al. . | |
| 4,854,414 | 8/1989 | Koide et al. ............ | 180/249 |
| 4,895,217 | 1/1990 | Hueckler et al. ......... | 180/233 |

FOREIGN PATENT DOCUMENTS 62-292532 12/1987 Japan .
63-011440 1/1988 Japan .

OTHER PUBLICATIONS

SAE Technical Paper Series, "1988 Lincoln Continental Variable-Assist Power Steering System", J. J. Duffy-2/1988.
Marks' Handbook for Mechanical Engineers-pp. 11-11, 11-12, 11-13.

Primary Examiner—Mitchell J. Hill
Attorney, Agent, or Firm—Oblon, Spivak, McClelland, Maier & Neustadt

[57] ABSTRACT

In a part-time four-wheel drive vehicle, and electric control apparatus for a transfer device in drive connection to a front or rear differential is arranged to permit selection of the four-wheel drive mode at the transfer device during travel of the vehicle in the two-wheel drive mode only in a condition where travel speed of the vehicle and temperature of lubricating oil in the differential are in a predetermined allowable region. The allowable region is defined to permit engagement of a clutch mechanism in the transfer drive mode without causing any heavy load acting thereon.

6 Claims, 16 Drawing Sheets

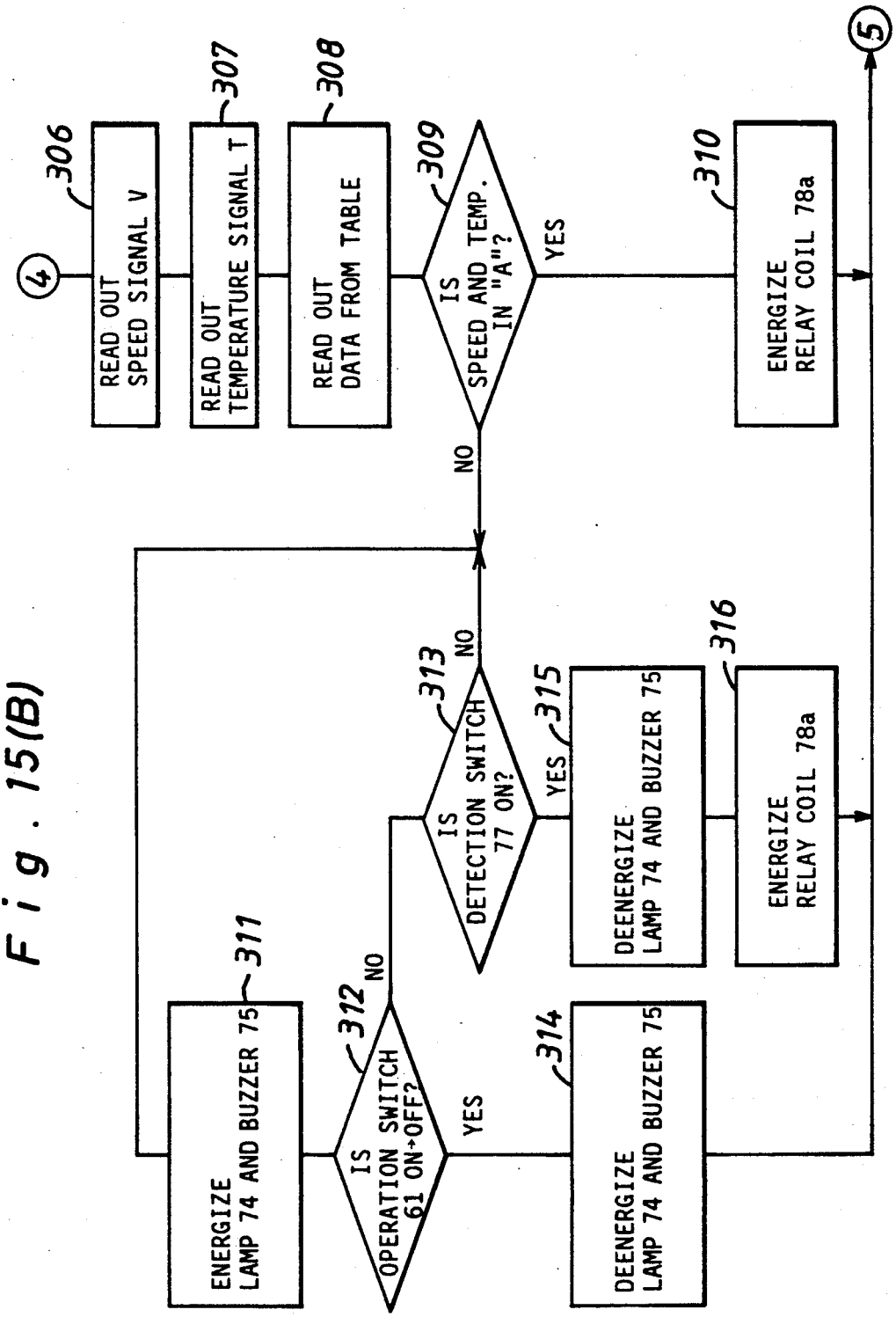

ELECTRIC CONTROL APPARATUS FOR TRANSFER DEVICE IN PART-TIME FOUR-WHEEL DRIVE VEHICLE

BACKGROUND OF THE INVENTION

1. Field of the Invention

The present invention relates to an electric control apparatus for a transfer device in part-time four-wheel drive vehicles, the transfer device being arranged to be switched over by operation of a manual operation switch to selectively provide a two-wheel drive mode or a four-wheel drive mode of operation for the vehicle.

2. Discussion of the Prior Art

In Japanese Utility Model Early Publication No. 63-69034, there has been proposed a part-time four-wheel drive system which includes a transfer device drivingly connected to a prime mover of the vehicle to continuously transfer the power from the prime mover to a set of rear road wheels and to selectively transfer the power to a set of front road wheels under control of a clutch mechanism provided therein, and a front differential in drive connection to split axle parts of the front road wheels at its output side and being drivingly connected to the transfer device at its input side to selectively transmit the power from the transfer device to the front road wheels under control of a clutch mechanism provided therein. In the part-time four-wheel drive system, each actuator of the clutch mechanisms in the transfer device and differential is activated under control of a manual operation switch. When the operation switch is manipulated by the driver to select a four-wheel drive mode, both the clutch mechanisms are engaged by activation of their associated actuators to transmit the power to the front road wheels through the transfer device and differential. When the operation switch is manipulated by the driver to select a two-wheel drive mode, both the clutch mechanisms are disengaged by activation of their associated actuators to disconnect the differential from the transfer device and from the split axle parts of the front road wheels. This is effective to eliminate back drive of the differential and propeller shaft for the non-driven front road wheels.

In the transfer device, a synchronizer is assembled with the clutch mechanism to establish synchronization between drive and driven members in the transfer device when the clutch mechanism is brought into engagement to select the four-wheel drive mode. The component parts of the synchronizer are applied with a heavy load from the driven member if the clutch mechanism is engaged in a condition where the viscous resistance of lubricating oil in the differential is increased due to drop of the ambient temperature to cause an increase of drag resistance of the driven member or in a condition where a difference in rotational speed between the drive and driven members is large during high speed travel of the vehicle. This results in defacement of the component parts of the synchronizer in a short period of time.

SUMMARY OF THE INVENTION

It is, therefore, a primary object of the present invention to provide an electric control apparatus for the transfer device in which travel speed of the vehicle and temperature of lubricating oil in the differential are detected to permit selection of the four-wheel drive mode at the transfer device during travel of the vehicle in the two-wheel drive mode only in a condition where any heavy load does not act on the clutch mechanism in the transfer device.

Another object of the present invention is to provide an electric control apparatus for the transfer device, having the above-described characteristics, in which indication means is provided to inform the driver of the fact that the selection of the four-wheel drive mode is prohibited during travel of the vehicle in the two-wheel drive mode. According to the present invention, there is provided an electric control apparatus for a part-time four-wheel drive vehicle having a transfer device drivingly connected to a prime mover of the vehicle to continuously transfer the power from the prime mover to a first set of road wheels, the transfer device including a first clutch mechanism arranged to transfer the power to a second set of road wheels when it has been engaged, a differential drivingly connected at its output side to the second set of road wheels and at its input side to the transfer device, the differential including a second clutch mechanism arranged to transmit the power from the transfer device to the second set of road wheels when it has been engaged, a first actuator assembled with the transfer device to engage the first clutch mechanism when it has been operated in one direction and to disengage the first clutch mechanism when it has been operated in the opposite direction, and a second actuator assembled with the differential to engage the second clutch mechanism when it has been operated in one direction and to disengage the second clutch mechanism when it has been operated in the opposite direction.

The electric control apparatus comprises a manual operation switch for selecting a two-wheel drive mode or a four-wheel drive mode at the transfer device, a speed sensor for detecting travel speed of the vehicle to produce a speed signal indicative the travel speed of the vehicle, a temperature sensor for detecting temperature of lubricating oil in the differential to produce a temperature signal indicative of the oil temperature, and control means in the form of a microcomputer responsive to the speed and temperature signals for operating the first and second actuators respectively in the one direction when the manual operation switch has been manipulated to select the four-wheel drive mode at the transfer device only in a condition where the travel speed and oil temperature are in a predetermined allowable region during travel of the vehicle in the two-wheel drive mode and for rendering the first and second actuators inoperative when the manual operation switch has been manipulated to select the four-wheel drive mode in a condition where the travel speed and oil temperature are out of the predetermined allowable region.

In a practical embodiment of the present invention, the predetermined allowable region is defined to permit engagement of the first clutch mechanism during travel of the vehicle in the two-wheel drive mode without causing any heavy load acting thereon. It is preferable that the electric control apparatus further comprises indication means for visually informing the driver of the fact that the first and second actuators have been rendered inoperative under control of the control means. In the case that the transfer device includes a change-speed mechanism, for instance in the form of a planetary gear unit, arranged to selectively provide low and high speed power trains for transfer of the power to the first and second sets of road wheels and a detection switch associated with the change-speed mechanism to produce a low speed signal therefrom when the change-speed mechanism is conditioned to provide the low speed power train and to produce a high speed signal therefrom when the change-speed mechanism is conditioned to provide the high speed power train, the control means of the electric control apparatus is further responsive to the high speed signal from the detection switch to operate the first and second actuators respectively in the one direction when the manual operation switch has been manipulated to select the four-wheel drive mode at the transfer device in a condition where the travel speed and oil temperature are in the predetermined allowable region during travel of the vehicle in the high speed two-wheel drive mode.

BRIEF DESCRIPTION OF THE DRAWINGS

Additional objects, features and advantages of the present invention will be readily appreciated from the following detailed description of preferred embodiments thereof when considered with reference to the accompanying drawings, in which:

FIG. 15(A) and 15(B) illustrate a flow chart representing a program executed by the microcomputer shown in FIG. 14.

DESCRIPTION OF THE PREFERRED EMBODIMENTS

Figure 1:
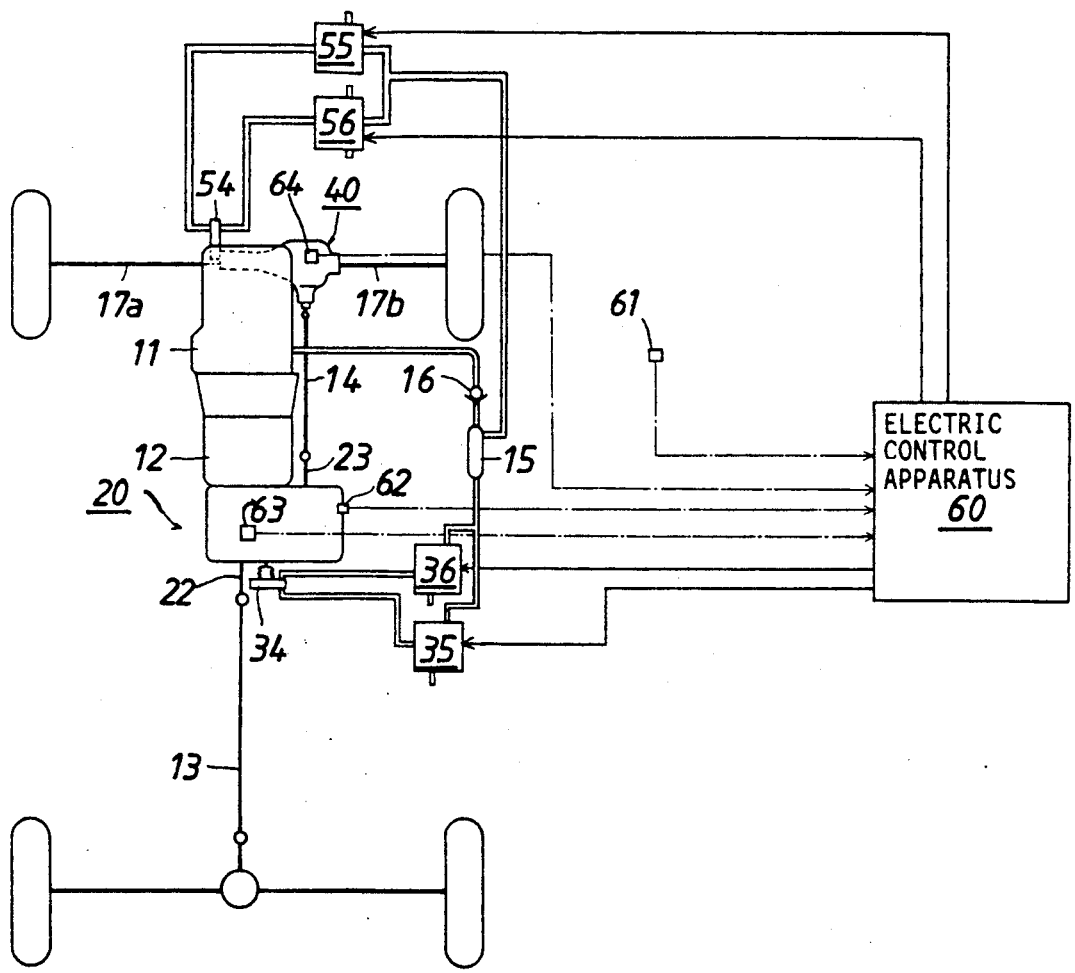
FIG. 1 is a schematic illustration of a part-time four-wheel drive vehicle equipped with a transfer device to be controlled by an electric control apparatus in accordance with the present invention.

Referring now to the drawings, in particular to FIG. 1, there is illustrated a part-time four-wheel drive vehicle which comprises an internal combustion engine 11 mounted on the front portion of a vehicle body structure, a power transmission 12 attached to the rear end of engine 11 through a conventional clutch mechanism, and a transfer device 20 united with the power transmission 12. The transfer device 20 is arranged to continuously transfer the power from transmission 12 to a set of rear road wheels and to selectively transfer the power to a set of front road wheels under control of a clutch mechanism 20a shown in FIG. 2.

Figure 2:
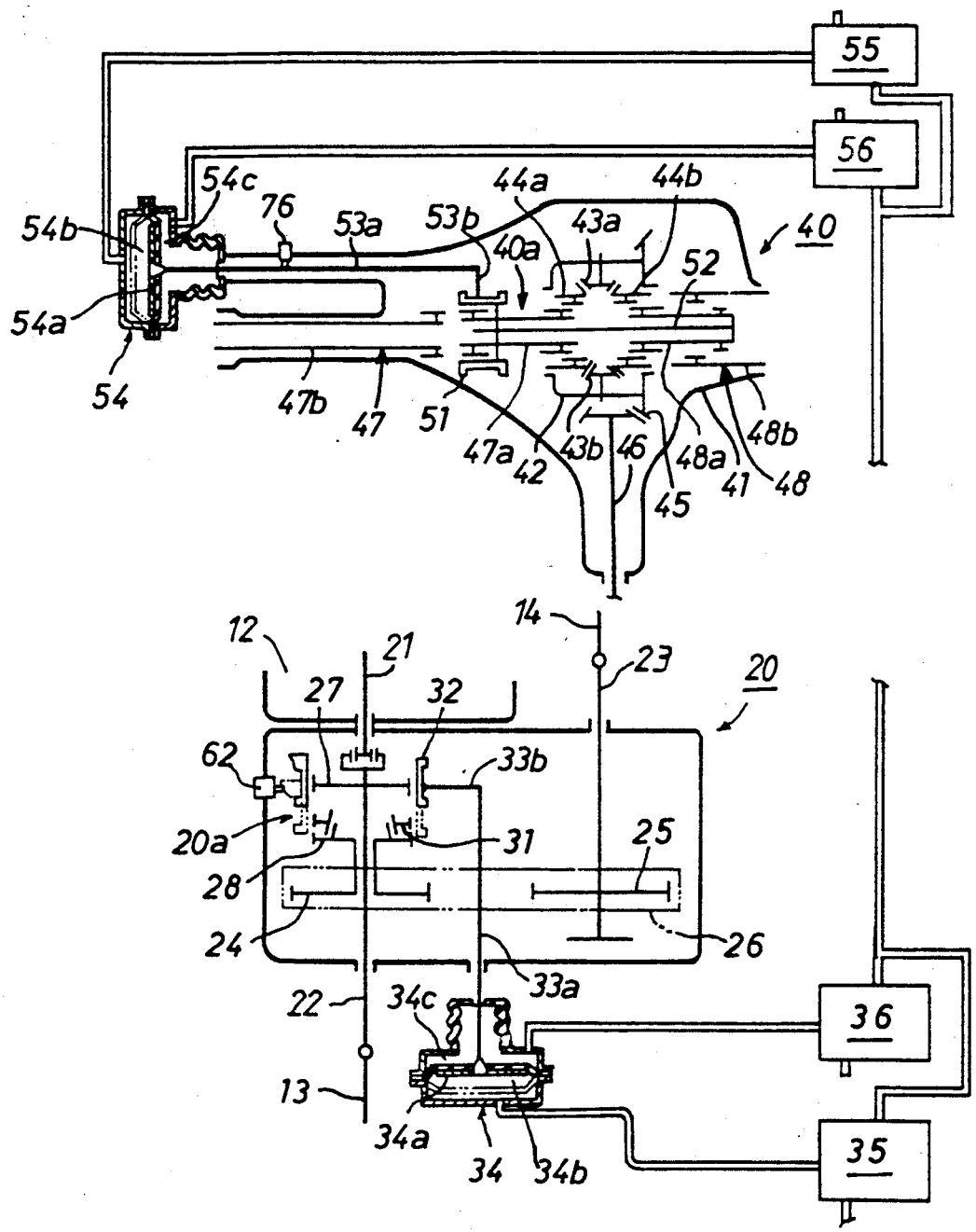
FIG. 2 is a schematic illustration of component parts of the transfer device and a front differential drivingly connected thereto.

As shown in FIGS. 1 and 2, the transfer device 20 includes an input shaft 21 drivingly connected to an output shaft of transmission 12, a first output shaft 22 coaxially connected to the input shaft 21 for drive connection to a rear propeller shaft 13, and a second output shaft 23 arranged in parallel with the first output shaft 22 for drive connection to a front propeller shaft 14. The first output shaft 22 is provided thereon with a drive sprocket 24 which is integrally provided with an externally splined clutch hub 28 and is arranged for relative rotation to the input shaft 22. An externally splined clutch hub 27 is mounted on the first output shaft 22 for rotation therewith, and an internally splined clutch sleeve 32 is axially slidably mounted on the clutch hub 27. The clutch sleeve 32 is shiftable between a first position where it is disengaged from the clutch hub 28 and a second position where it is engaged with the clutch hub 28. The clutch sleeve 32 is arranged to be shifted by a vacuum actuator 34 of the diaphragm type through a fork shaft 33a and a shift fork 33b. A driven sprocket 25 is mounted on the second output shaft 23 for rotation therewith and is drivingly connected to the drive sprocket 24 by means of a drive chain 26.

Figure 3:
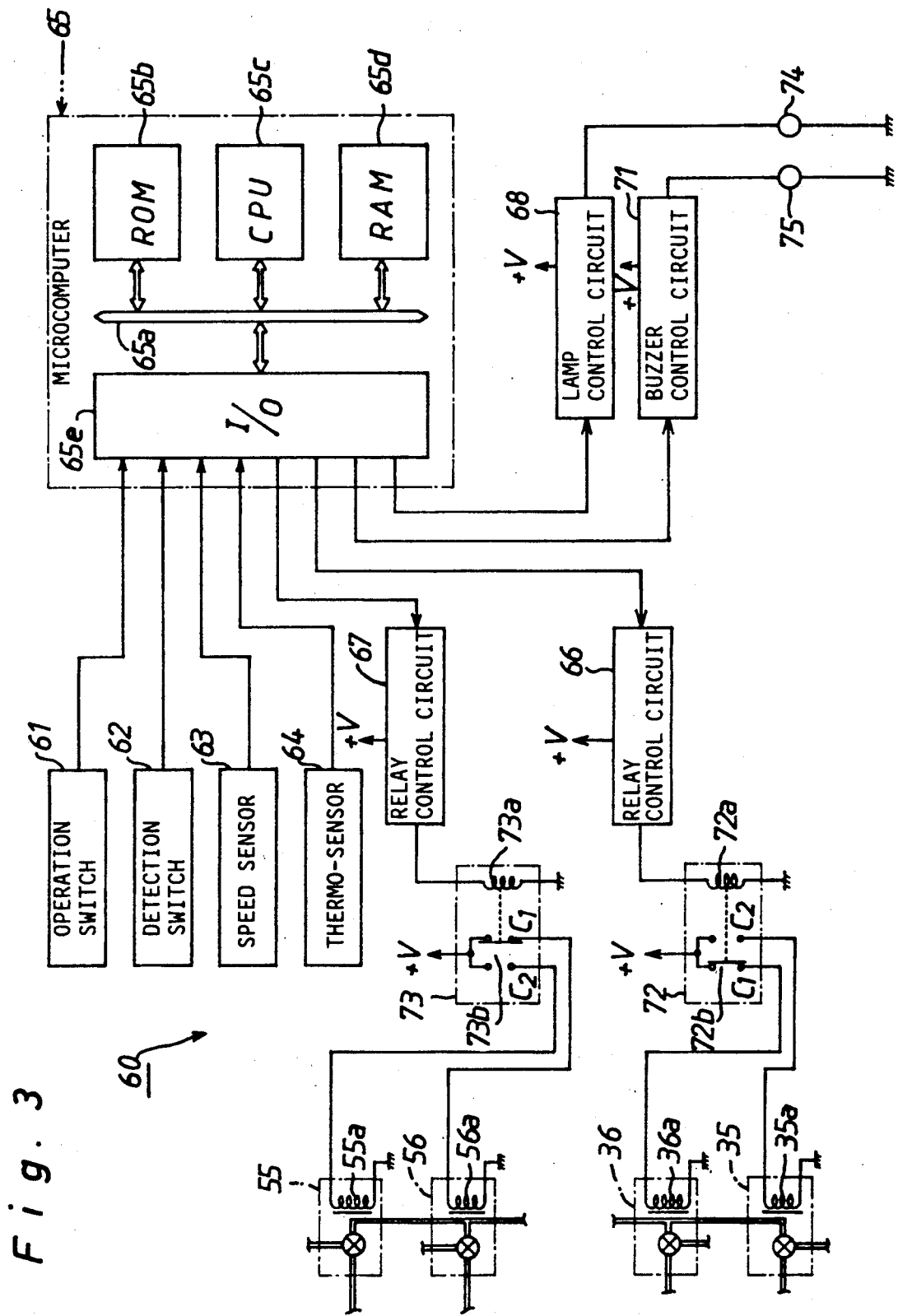
FIG. 3 is a block diagram of the electric control apparatus.

The clutch mechanism 20a of transfer device 20 includes a synchronizer ring 31 rotatably coupled with a conical portion of clutch hub 28 to establish synchronization between the clutch hubs 27, 28 in shifting operation of the clutch sleeve 32 toward the second position. The vacuum actuator 34 is assembled with the transfer device 20 in an appropriate manner, which includes a diaphragm piston 34a assembled within an actuator housing to subdivide the interior of the housing into first and second pneumatic chambers 34b and 34c. The fork shaft 33a is connected at its outer end to the diaphragm piston 34a, and the pneumatic chambers 34b, 34c are connected to a vacuum tank 15 respectively through electrically operated switchover valves 35, 36. As shown in FIG. 3, the switchover valve 35 is provided with a solenoid 35a, while the switchover valve 36 is provided with a solenoid 36a. During deenergization of the solenoids 35a, 36a, the switchover valves 35, 36 each are maintained in a first position to communicate the pneumatic chambers 34b, 34c with the atmospheric air. When the solenoid 35a or 36a is selectively energized, the switchover valve 35 or 36 is switched over from the first position to a second position to communicate the pneumatic chamber 34b or 34c to the vacuum tank 15. The vacuum tank is connected to an intak manifold of engine 11.

The front propeller shaft 14 is drivingly connected at its front end to a front differential 40 and at its rear end to the second output shaft 23 of transfer device 20. The front differential 40 is arranged to selectively transmit the power from propeller shaft 14 to split axle shafts 17a, 17b of the front road wheels under control of a clutch mechanism 40a. The front differential 40 includes a differential case 42 rotatably mounted within a differential carrier 41. The differential case 42 is provided therein with a pair of pinion gears 43a, 43b and a pair of side gears 44a, 44b in mesh with pinion gears 43a, 43b. The differential case 42 is provided thereon with a ring gear 45 in mesh with a drive pinion 46 connected to the front propeller shaft 14 for rotation therewith. Disposed between the split axle shafts 17a, 17b are tubular drive shafts 47, 48 which are divided into inner shafts 47a, 48a and outer shafts 47b, 48b, respectively. The inner shafts 47a, 48a are drivingly connected at their inner ends to the side gears 44a, 44b, while the outer shafts 47b, 48b are drivingly connected at their outer ends to the split axle shafts 17a, 17b, respectively.

The clutch mechanism 40a of front differential 40 includes an internally splined clutch sleeve 51 axially slidably mounted on the inner shaft 47a and an operation rod 52 connecting the clutch sleeve 51 to the inner shaft 48a. When shifted from a first position to a second position, the clutch sleeve 51 is engaged with the outer shaft 47b to establish drive connection between the inner and outer shafts 47a, 47b. Simultaneously, the operation rod 52 is shifted to establish drive connection between the inner and outer shafts 48a, 48b. The clutch sleeve 51 is arranged to be shifted by a vacuum actuator 54 of the diaphragm type through a fork shaft 53a and a shift fork 53b.

The vacuum actuator 54 is assembled with the front differential 40 in an appropriate manner, which includes a diaphragm piston 54a assembled within an actuator housing to subdivide the interior of the housing into first and second pneumatic chambers 54b and 54c. The fork shaft 53a is connected at its outer end to the diaphragm piston 54a, and the pneumatic chambers 54b, 54c are connected to the vacuum tank 15 respectively through electrically operated switchover valves 55, 56. As shown in FIG. 3, the switchover valve 55 is provided with a solenoid 55a, while the switchover valve 56 is provided with a solenoid 56a. During deenergization of the solenoids 55a, 56a, the switchover valves 55, 56 each are maintained in a first position to communicate the pneumatic chambers 54b, 54c with the atmospheric air. When the solenoid 55a or 56a is selectively energized, the switchover valve 55 or 56 is switched over from the first position to a second position to communicate the pneumatic chamber 54b or 54c to the vacuum tank 15.

As shown in FIGS. 1 and 3, an electric control apparatus 60 for the transfer device 20 and front differential 40 includes a manual operation switch 61, a detection switch 62, a speed sensor 63 and a thermo-sensor 64. The manual operation switch 61 is in the form of a normally open switch of the momentary contact type which is provided on an instrument panel (not shown) of the vehicle to be closed by manipulation of the driver. The detection switch 62 is in the form of a normally open switch mounted on the housing of transfer device 20 and arranged to face the clutch sleeve 20a as shown in FIG. 2. Thus, the detection switch 62 is maintained in its open position when the clutch sleeve 32 is in the first position and is closed by engagement with a projection of clutch sleeve 32 when it is shifted to and maintained in the second position as shown by imaginary lines in FIG. 2. The speed sensor 63 is mounted on the housing of transfer device 20 to detect the rotational speed of first output shaft 22 thereby to produce an electric speed signal V indicative of travel speed of the vehicle. The thermo-sensor 64 is mounted on the housing of front differential 40 to detect a temperature of lubricating oil in the differential carrier 41 thereby to produce an electric oil temperature signal T indicative of the temperature of lubricating oil.

The electric control apparatus 60 includes a microcomputer 65 which is connected to the switches 61, 62 and sensors 63, 64. The computer 65 comprises a rear-only memory or ROM 65b, a central processing unit or CPU 65c, a random access memory or RAM 65d and an input-output device or I/O 65e which are connected to one another by means of a common bus line 65a. The ROM 65b is arranged to memorize a program represented by a flow chart shown in FIG. 4 and to memorize control data in the form of a table defining allowable and prohitive regions A and B based on a relationship between travel speed of the vehicle and temperature of the lubricating oil shown in FIG. 5. In the allowable region A, the clutch mechanism 20a can be engaged without causing any heavy load acting on the synchronizer 31. In the prohibitive region B, the sychronizer 31 is applied with a heavy load in engagement of the clutch mechanism 20a. The CPU 65c is arranged to initiate execution of the program when an ignition switch (not shown) is closed and to repeat execution of the program. The RAM 65d is arranged to temporarily memorize necessary data for execution of the program. The I/O 65e is connected to the switches 61, 62 and sensors 63, 64 and connected to relay control circuits 66, 67, a lamp control circuit 68 and a buzzer control circuit 71.

The relay control circuits 66, 67 are connected to relay circuits 72, 73 to selectively energize relay coils 72a and 73a under control of the computer 65. The relay circuit 72 includes a relay switch 72b the movable contact of which is maintained in engagement with a fixed contact $C_1$ during deenergization of the relay coil 72a to be engaged with a fixed contact $C_2$ in response to energization of the relay coil 72a. Similary, the relay circuit 73 includes a relay switch 73b the movable contact of which is maintained in engagement with a fixed contact $C_1$ during deenergization of the relay coil 73a to be engaged with a fixed contact $C_2$ in response to energization of the relay coil 73a. With such arrangements, the solenoids 35a, 36a of switchover valves 35, 36 are selectively energized under control of the relay switch 72b, while the solenoids 55a, 56a of switchover valves 55, 56 are selectively energized under control of the relay switch 73b. The lamp control circuit 68 is arranged to light an indication lamp 74 on the instrument panel under control of the computer 65. The buzzer control circuit 71 is arranged to energize a buzzer in the vehicle compartment under control of the computer 65.

Figure 4A:
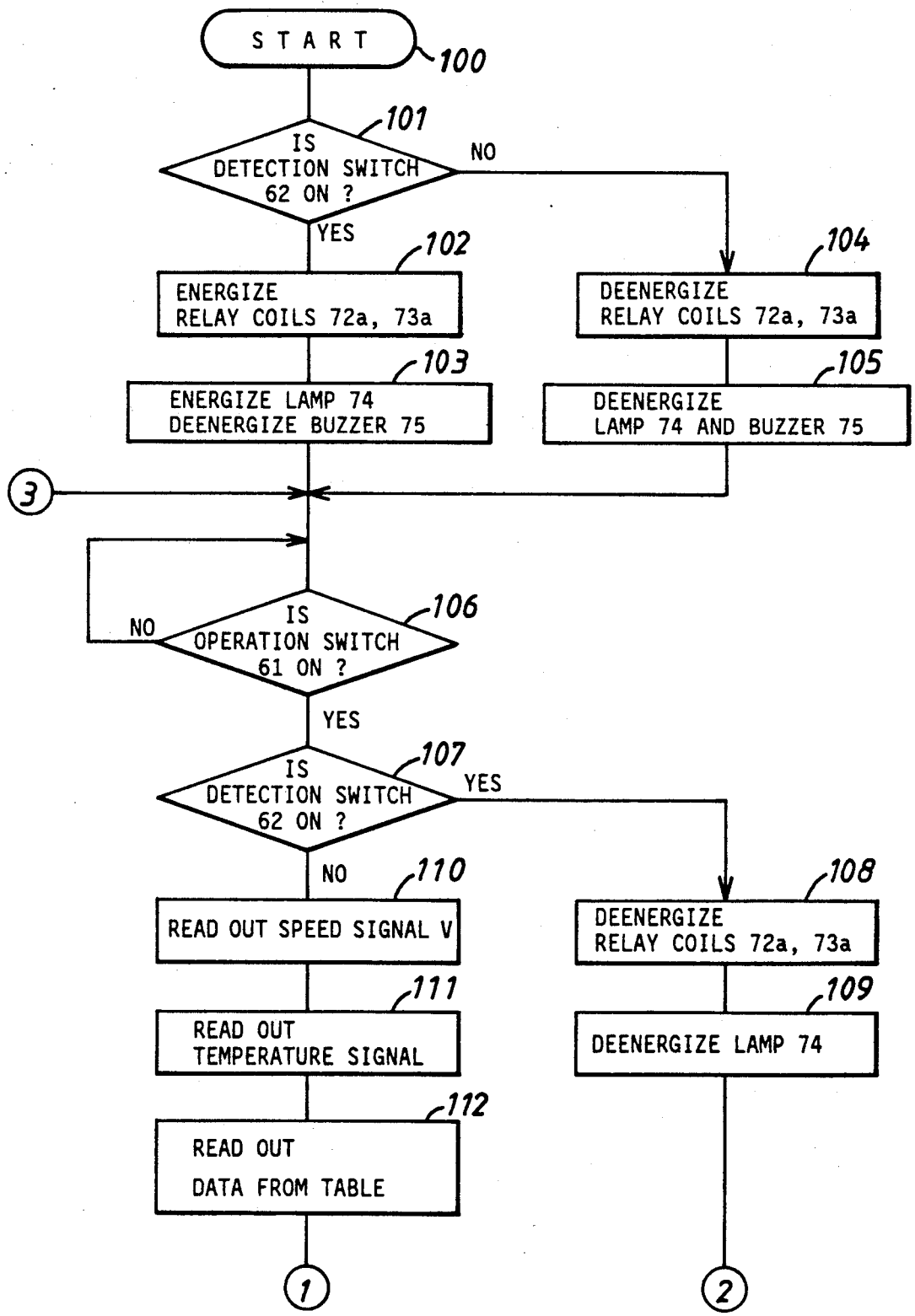
FIGS. 4(A) and 4(B) illustrate a flow chart of a program for a microcomputer in the electric control apparauts.
Figure 4B:
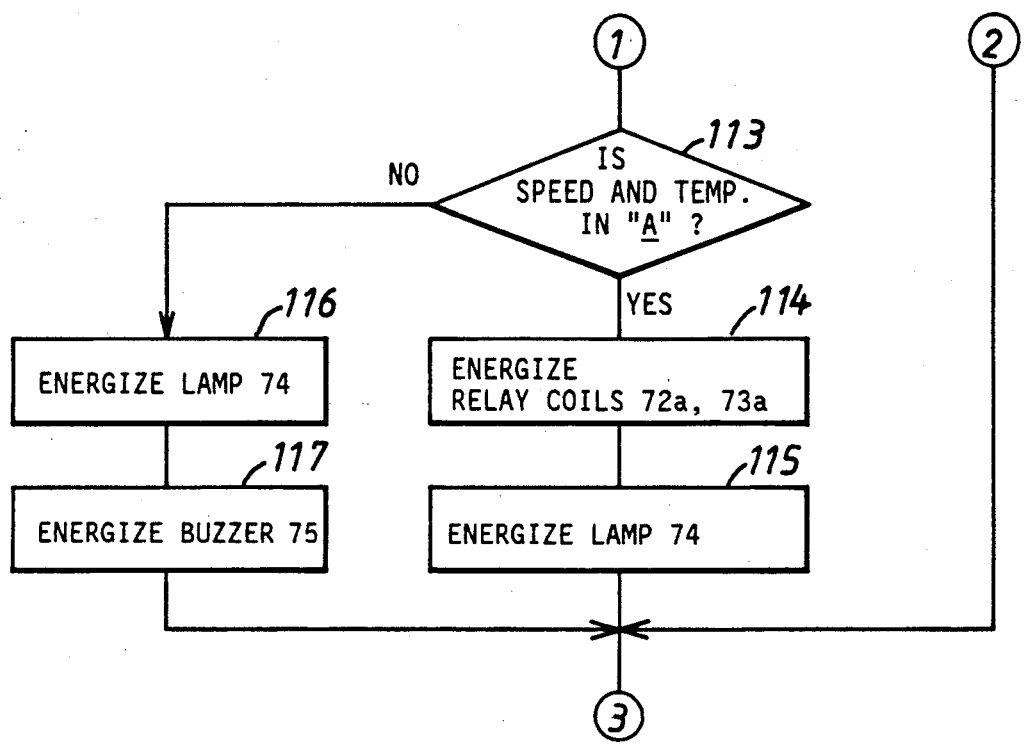

Hereinafter, the operation of the computer 65 will be described in detail with reference to the flow chart shown in FIGS. 4(A) and 4(B). Assuming that the ignition switch is maintained in its open position, the switchover valves 35, 36 and 55, 56 are maintained in their first positions to communicate the pneumatic chambers 34b, 34c and 54b, 54c of vacuum actuators 34 and 54 with the atmospheric air. Accordingly, the clutch mechanisms 20a and 40a in the transfer device 20 and front differential 40 are each maintained in a position defined by the prior mode of operation. When the ignition switch is closed to start the engine 11, the electric control apparatus 60 is activated by supply of the electric power from an electric power source (not shown) in the form of a vehicle battery, and in turn, the CPU 65c of computer 65 starts to execute the program at step 100 in the flow chart of FIG. 4. When the program proceeds to step 101, the CPU 65c determines as to whether the detection switch 62 is turned on or not.

If the four-wheel drive mode is previously selected at the transfer device 20, the detection switch 62 is turned on. Thus, the CPU 65c determines a "Yes" answer at step 101 and causes the program to proceed to step 102. At step 102, the CPU 65c produces control signals for energization of the relay coils 72a, 73a and causes the program to proceed to step 103 where the CPU 65c produces control signals for energization of the indication lamp 74 and for maintaining the buzzer 75 in its deenergized condition. As a result, the relay control circuits 66 and 67 act to energize the relay coils 72a, 73a in response to the control siganls from the CPU 65c so that the movable contacts of relay switches 72b, 73b are connected to the fixed contacts $C_2$ to energize the solenoids 35a, 55a of switchover valves 35, 55. On the other hand, the solenoids 36a, 56a of switchover valves 36, 56 are maintained in their deenergized condition. In such a condition, the switchover valves 35 and 55 are switched over from their first positions to their second positions to communicate the pneumatic chambers 34b, 54b of actuators 34, 54 with the vacuum tank 15, while the switchover valves 36, 56 are maintained in their first positions to communicate the pneumatic chambers 34c, 54c with the atmospheric air. Thus, the diaphragm piston 34a of actuator 34 is moved by the difference in pressure between the pneumatic chambers 34b and 34c to shift the clutch sleeve 32 from the first position to the second position thereby to establish drive connection between the first and second output shafts 22 and 23. Simultaneously, the diaphragm piston 54a of actuator 54 is moved by the difference in pressure between the pneumatic chambers 54b and 54c to shift the clutch sleeve 51 from the first position to the second position thereby to establish drive connection between the inner shafts 47a, 48a and the outer shafts 47b, 48b. Under such control as described above, the transfer device 20 is maintained in the four-wheel drive mode, the indication lamp 74 is lighted to inform the driver of the four-wheel drive mode, and the buzzer 75 is maintained in its deenergized condition.

If the two-wheel drive mode is previously selected at the transfer device 20, the detection switch 62 is turned off. Thus, the CPU 65c determines a "No" answer at step 101 and causes the program to proceed to step 104. At step 104, the CPU 65c produces control signals for maintaining the relay coils 72a, 73a in their deenergized conditions and causes the program to proceed to step 105 where the CPU 65c produces control signals for maintaining the indication lamp 74 and buzzer 75 in their deenergized conditions. As a result, the relay control circuits 66 and 67 act to maintain the relay coils 72a, 73a in their deenergized conditions in response to the control signals from the CPU 65c so that the movable contacts of relay switches 72b, 73b are maintained in connection to the fixed contacts $C_1$ to energize the solenoids 36a, 56a of switchover valves 36, 56. On the other hand, the solenoids 35a, 55a of switchover valves 35, 55 are maintained in their deenergized conditions. In such a condition, the switchover valves 36, 56 are switched over from their first positions to their second positions to communicate the pneumatic chambers 34c, 54c of actuators 34, 54 with the vacuum tank 15, while the switchover valves 35, 55 are maintained in their first positions to communicate the pneumatic chambers 34b, 54b with the atmospheric air. Thus, the diaphragm piston 34a of actuator 34 is moved by the difference in pressure between the pneumatic chambers 34b and 34c to shift the clutch sleeve 32 from the second position to the first position thereby to disconnect the second output shaft 23 from the first output shaft 22. Simultaneously, the diaphragm piston 54a of actuator 54 is moved by the difference in pressure between the pneumatic chambers 54b, 54c to shift the clutch sleeve 51 from the second position to the first position thereby to disconnect the outer shafts 47b, 48b from the inner shafts 47a, 48a. Under such control as described above, the transfer device 20 is maintained in the two-wheel drive mode, the indication lamp 74 is put out, and the buzzer 75 is maintained in its deenergized condition.

After execution of the initial setting routine at steps 101-105, the program proceeds to step 106 where the CPU 65c determines as to whether the manual operation switch 61 has been operated or not. If the answer is "No" at step 106, the CUP 65c will repeat the execution at step 106. When the manual operation switch 61 is operated, the CPU 65c determines a "Yes" answer at step 106 and causes the program to proceed to step 107 where the CPU 65c determines as to whether the detection switch 62 is turned on or not. When the four-wheel drive mode is previously selected at the transfer device 20, the CPU 65c determines a "Yes" answer at step 107 and causes the program to proceed to step 108. At step 108, the CPU 65c produces control signals for maintaining the relay coils 72a, 73a in their deenergized conditions. At the following step 109, the CPU 65c produces control signals for maintaining the indication lamp 74 in its deenergized condition. As a result, the relay coils 72a, 73a are maintained in their deenergized conditions under control of the relay control circuits 66, 67 to energize the solenoids 36a, 56a of switchover valves 36, 56. Thus, the vacuum actuators 34, 35 are operated to disengage the clutch mechanisms 20a and 40a thereby to establish the two-wheel drive mode. In such a condition, the indication lamp 74 is put out under control of the lamp control circuit 68.

Assuming that the two-wheel drive mode is previously selected at the transfer device when the operation switch 61 has been operated, the CPU 65c determines a "No" answer at step 107 and causes the program to proceed to step 110 where the CPU 65c reads out a speed signal V from sensor 63. At the following step 111, the CPU 65c reads out an oil temperature signal T from sensor 64 and causes the program to proceed to step 112 where the CPU 65c reads out the control data defined by the graph of FIG. 5 from the ROM 65b. When the program proceeds to step 113, the CPU 65c determines as to whether or not travel speed of the vehicle and temperature of the lubricating oil are in the allowable region A shown in FIG. 5. If the answer is "Yes" at step 113, the CPU 65c produces the control signals for energization of the relay coils 72a, 73a at step 114 and produces the control signal for energization of the indication lamp 74. As a result, the relay coils 72a, 73a are energized under control of the relay control circuits 66, 67 to energize the solenoids 35a, 55a of switchover valves 35, 55. Thus, the vacuum actuators 34, 35 are operated to engage the clutch mechanisms 20a and 40a thereby to establish the four-wheel drive mode. In such a condition, the indication lamp 74 is lighted under control of the lamp control circuit 68.

If the answer is "No" at step 113, the program proceeds to step 116 where the CPU 65c produces a control signal for intermittently energizing the indication lamp 74 and causes the program to proceed to step 117 where the CPU 65c produces a control signal for energization of the buzzer 75 and returns the program to step 106 for repetitive execution at steps 106–113. In such a condition, the indication lamp 74 is intermittently lighted under control of the lamp control circuit 68, and the buzzer 75 issues alarm sounds for a predetermined period of time under control of the buzzer control circuit 71. Even if in such a condition the operation switch 61 is operated, the four-wheel drive mode will not be selected at the trasfer device 20.

Figure 5:
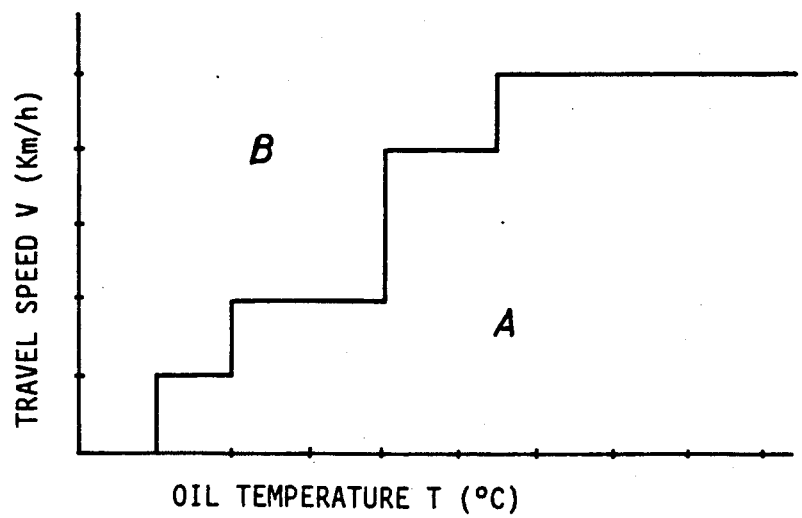
FIG. 5 is a graph showing a relationship between temperature of lubricating oil in the front differential and travel speed of the vehicle.

From the above description, it will be understood that the mode of operation of the transfer device 20 can be switched over from the two-wheel drive mode to the four-wheel drive mode only in a condition where travel speed of the vehicle and temperature of the lubricating oil are in the allowable region A shown in FIG. 5. This is effective to eliminate a heavy load acting on the synchronizer 31 in engagement of the clutch mechanism 20a.

Figure 6:
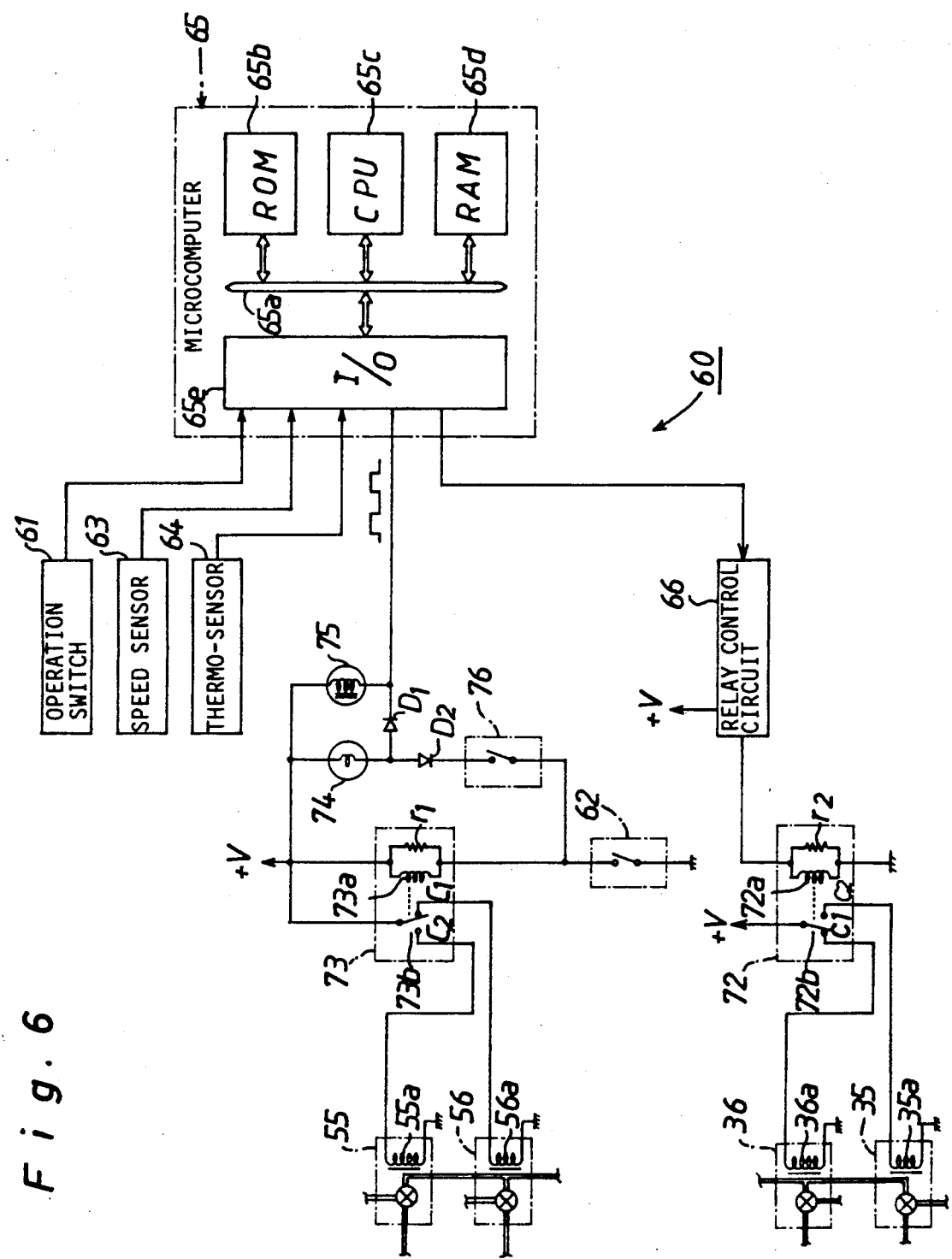
FIG. 6 is a block diagram of a modification of the electric control apparatus shown in FIG. 3.

In FIG. 6, there is illustrated a modification of the electric control apparatus shown in FIG. 3, wherein the manual operation switch 61 is in the form of a self-hold type switch which is adapted to select the two-wheel drive mode in its open position and to select the four-wheel drive mode in its closed position, and wherein the detection switch 62 is connected at its one end to the electric power source through the relay coil 73a and grounded at its other end, the relay coil 73a being connected in parallel with a resistor $r_1$. In this modification, the ROM 65b of computer 65 is arranged to memorize a program represented by a flow chart shown in FIG. 7 and to memorize the control data of FIG. 5. The indication lamp 74 and buzzer 75 are connected in parallel to one another through a diode $D_1$ and connected at their one ends to the electric power source. The indication lamp 74 is connected at its other end to a connection point between the detection switch 62 and relay coil 73a through a diode $D_2$ and an additional detection switch 76. As shown in FIG. 2, the additional detection switch 76 is mounted on the front differential 40 to detect the position of the clutch mechanism 40a and is arranged to be opened when the clutch sleeve 51 is retained in the first position and to be closed when the clutch sleeve 51 is shifted to the second position to engage the clutch mechanism 40a. The buzzer 75 is connected at its other end to the I/O 65e of computer 65 in such a manner that the I/O 65e maintains a connection point between the buzzer 75 and diode $D_1$ in a open condition. Only when the indication lamp 74 and buzzer 75 are controlled, the voltage at the connection point between buzzer 75 and diode $D_1$ is alternately switched over between the source voltage +V and ground voltage. The relay 72a is connected in parallel with a resistor $r_2$. The other arrangements are substantially the same as those of the electric control apparatus shown in FIG. 3.

Figure 7:
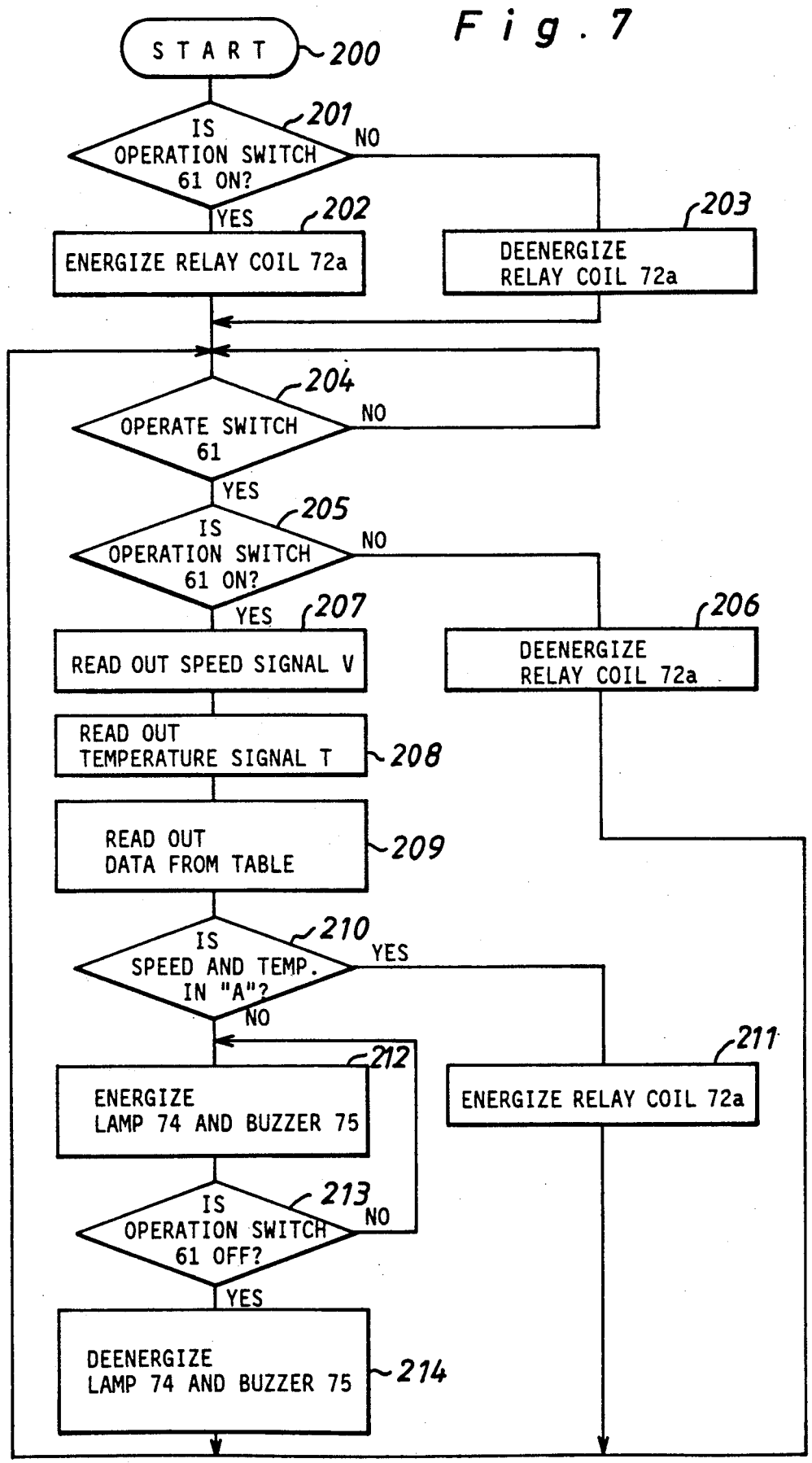
FIG. 7 is a flow chart illustrating a program for a microcomputer in the electric control circuit shown in FIG. 6.

Hereinafter, the operation of the modified electric control appatatus will be described in detail with reference to FIG. 7. When the ignition switch is maintained in its open position, the transfer device 20 and front differential 40 are each maintained in a condition defined by the prior mode of operation. When the ignition switch is closed to start the engine 11, the electric control apparatus is activated by supply of the electric power, and in turn, the CPU 65c of computer 65 starts to execute the program at step 200 in the flow chart of FIG. 7. When the program proceeds to step 201, the CPU 65c determines as to whether or not the operation switch 61 is maintained in the closed position.

If the four-wheel drive mode is previously selected at the transfer device 20, the operation switch 61 is maintained in its closed position. Thus, the CPU 65c determines a "Yes" answer at step 201 and causes the program to proceed to step 202 where the CUP 65c produces a control signal for energization of the relay coil 72a. As a result, the relay control circuit 66 acts to energize the relay coil 72a in response to the control signal from the CPU 65c so that the movable contact of relay switch 72b is connected to the fixed contact $C_2$ to energize the solenoid 35a of switchover valve 35 and to deenergize the solenoid 36a of switchover valve 36. In such a condition, the switchover valve 35 is switched over from the first position to the second position to communicate the pneumatic chamber 34b of actuator 34 with the vacuum tank 15, while the switchover valve 36 is maintained in the first position to communicate the pneumatic chamber 34c with the atmospheric air. Thus, the diaphragm piston 34a of actuator 34 is moved by the difference in pressure between pneumatic chambers 34b and 34c to shift the clutch sleeve 32 from the first position to the second position thereby to establish drive connection between the first and second output shafts 22 and 23 in the transfer device 20. As the detection switch 62 is turned on by movement of the clutch sleeve 32 to the second position, the relay coil 73a is energized to connect the movable contact of relay switch 73b to the fixed contact $C_2$. Thus, the solenoid 55a of switchover valve 55 is energized, while the solenoid 56a of switchover valve 56 is deenergized. In turn, the switchover valve 55 is switched over from the first position to the second position to communicate the pneumatic chamber 54b with the vacuum tank 51, while the switchover valve 56 is maintained in the first position to communicate the pneumatic chamber 54c with the atmospheric air. Thus, the diaphargm piston 54a of actuator 54 is moved by the difference in pressure between pneumatic chambers 54b and 54c to shift the clutch sleeve 51 to the second position from the first position thereby to establish drive connection between the inner shafts 47a, 48a and the outer shafts 47b, 48b. Under such control as described above, the mode of operation of the vehicle is maintained in the four-wheel drive mode. As the detection switch 76 is turned on by movement of the clutch sleeve 51 to the second position, the indication lamp 74 is grounded through the diode $D_2$ and switches 76, 62. As a result, the indication lamp 74 is lighted to inform the driver of the four-wheel drive mode.

If the two-wheel drive mode is previously selected at the transfer device 20, the operation switch 61 is maintained in its open position. Thus, the CPU 65c determines a "No" answer at step 201 and causes the program to proceed to step 203 where the CUP 65c produces a control signal for maintaining the relay coil 72a in its deenergized condition. As a result, the movable contact of relay switch 72b is maintained in connection with the fixed contact $C_1$ under the relay control circuit 66 to energize the solenoid 36a of switchover valve 36 and to deenergize the solenoid 35a of switchover valve 35. In such a condition, the switchover valve 36 is switched over from the first position to the second position to communicate the pneumatic chamber 34c of actuator 34 with the vacuum tank 15, while the switchover valve 35 is maintained in the first position to communicate the pneumatic chamber 34b with the atmospheric air. Thus, the diaphragm piston 34a of actuator 34 is moved by the difference in pressure between pneumatic chambers 34b and 34c to shift the clutch sleeve 32 from the second position to the first position thereby to disconnect the first output shaft 22 from the second output shaft 23 in the transfer device 20. As the detection switch 62 is turned off by movement of the clutch sleeve 32 to the first position, the relay coil 73a is deenergized to connect the movable contact of relay switch 73b to the fixed contact $C_1$. Thus, the solenoid 56a of switchover valve 56 is energized, while the solenoid 55a of switchover valve 55 is deenergized. In turn, the switchover valve 56 is switched over from the first position to the second position to communicate the pneumatic chamber 54c with the vacuum tank 51, while the switchover valve 55 is maintained in the first position to communicate the pneumatic chamber 54b with the atmospheric air. Thus, the diaphargm piston 54a of actuator 54 is moved by the difference in pressure between pneumatic chambers 54b and 54c to shift the clutch sleeve 51 to the first position from the second position thereby to disconnect the inner shafts 47a, 48a from the outer shafts 47b, 48b. Under such control as described above, the mode of operation of the vehicle is maintained in the two-wheel drive mode. As the detection switches 62 and 76 are turned off by movement of the clutch sleeves 32 and 51 to their first positions, the indication lamp 74 is put out to inform the driver of the two-wheel drive mode.

After execution of the initial setting routine at steps 201–203, the program proceeds to step 204 where the CPU 65c determines as to whether the operation switch 61 has been operated or not. If the answer is "Yes" at step 204, the CPU 65c causes the program to proceed to step 205 where the CPU 65c determines as to whether or not the operation switch 61 is maintained in its closed position. When the operation switch 61 is switched over from its closed position to its open position for selecting the two-wheel drive mode, the CPU 65c determines a "No" answer at step 205 and causes the program to proceed to step 206 where the CPU 65c produces a control signal for deenegizing the relay coil 72a. As a result, the mode of operation of the vehicle is switched over from the four-wheel drive mode to the two-wheel drive mode in such a manner as described above. When the operation switch 61 is switched over from its open position to its closed position for selecting the four-wheel drive mode, the CPU 65c determines a "Yes" answer at step 205 and causes the program to proceed to step 207 where the CPU 65c reads out an electric speed signal V from sensor 63. At the following step 208, the CPU 65c reads out an electric oil temperature signal T from sensor 64 and causes the program to proceed to step 209 where the CPU 65c reads out the control data from the ROM 65b. When the program proceeds to step 210, the CPU 65c determines as to whether or not travel speed of the vehicle and temperature of the lubricating oil are in the allowable region A shown in FIG. 5. If the answer is "Yes" at step 210, the CPU 65c produces a control signal for energization of the relay coil 72a. As a result, the mode of operation of the vehicle is switched over from the two-wheel drive mode to the four-wheel drive mode.

If the answer is "No" at step 210, the program proceeds to step 212 where the CPU 65c acts to produce a control signal for intermittently energizing the indication lamp 74 and to produce a command signal for energizing the buzzer 75 and apply it to the I/O 65e. When applied with the command signal, the I/O 65e acts to alternately switch over the voltage applied to the buzzer 75 and indication lamp 74 between the source voltage +V and ground voltage. Thus, the indication lamp 74 is intermittently lighted, and the buzzer 75 issues alarm sounds therefrom to inform the driver of the fact that the four-wheel drive mode may not be selected at the transfer device 20. After execution at step 212, the program proceeds to step 213 where the CPU 65c determines as to whether the operation switch 61 has been returned to its open position or not. When the operation switch 61 is returned to its open position, the CPU 65c determines a "Yes" answer at step 213 and causes the program to proceed to step 214 where the CPU 65c produces a command signal for deenergizing the indication lamp 74 and buzzer 75 and applies it to the I/O 65e. When applied with the command signal, the I/O 65e acts to make the connection point between buzzer 75 and diode $D_1$ in a open condition. In turn, the indication lamp 74 and buzzer 75 are deenergized, and the program returns to step 204.

Figure 8:
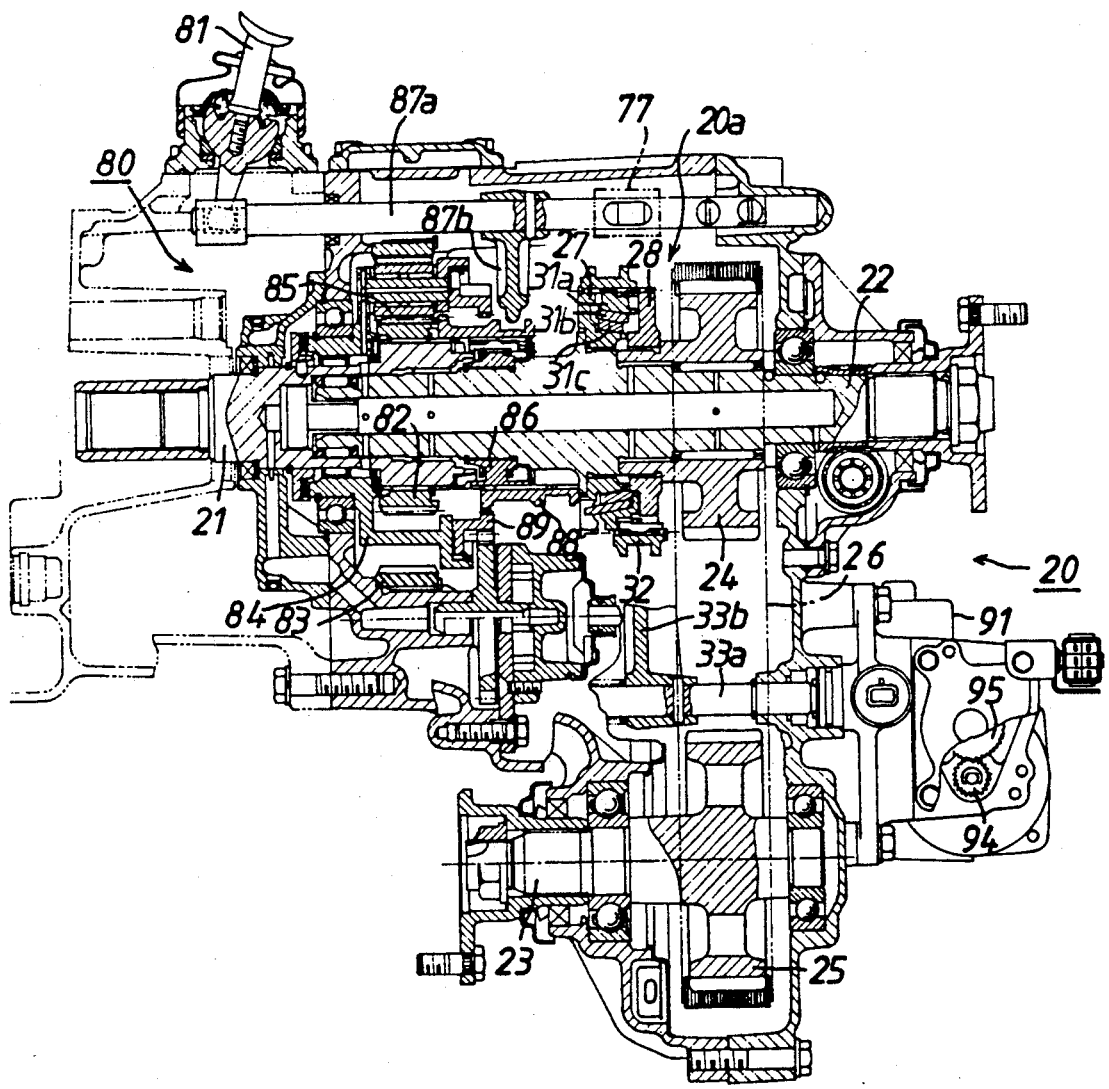
FIG. 8 is a full sectional view of a practical embodiment of the transfer device schematically shown in FIG. 2.

In FIG. 8 there is illustrated a practical embodiment of the transfer device 20, wherein the same component parts and portions as those shown in FIG. 2 are indicated by the same reference numerals. In this embodiment, the transfer device 20 comprises a planetary gear unit 80 for selectively providing low and high speed power trains between the input and output shafts 21 and 22 in accordance with operation of a manual lever 81. The planetary gear unit 80 includes a sun gear 82 mounted on the input shaft 21 for rotation therewith, a ring gear 83 fixedly mounted within the housing of transfer device 20 in surrounding relationship with the sun gear 82, a carrier 84 rotataly mounted on a left-hand side wall of the transfer housing, and a plurality of planetary gears 85 rotatably supported by the carrier 84 and in mesh with the sun and ring gears 82 and 83. An internally splined clutch sleeve 88 is axially slidably mounted on an externally splined hub member 86 which is fixed to the output shaft 22. The clutch sleeve 88 is arranged to be shifted by the manual lever 81 through a fork shaft 87a and a shift fork 87b. When shifted leftward by operation of the manual lever 81, the clutch sleeve 88 is connected to an externally splined inner end of input shaft 21 to transmit the power from input shaft 21 to the output shaft 22 at a high speed. When shifted righward by operation of the manual lever 81, the clutch sleeve 88 is engaged at its left end with an annular spline piece 89 fixed to the carrier 84 to transmit the power from input shaft 21 to the output shaft 22 through the sun and planetary gears 82 and 85 at a low speed.

In the practical embodiment of transfer device 20, a pair of axially spaced synchronizers are mounted on the output shaft 22 to effect synchronization in shifting operation of the clutch sleeve 88, and the clutch mechanism 20a includes synchronizer rings 31a, 31b and 31c which are mounted on the output shaft 22 to effect synchronization in shifting operation of the clutch sleeve 32. The clutch sleeve 32 is arranged to be shifted by an electric motor 91 through the fork shaft 33a and shift fork 33b. In this embodiment, the electric motor 91 is substituted for the vacuum actuator 34 shown in FIG. 2.

Figure 10:
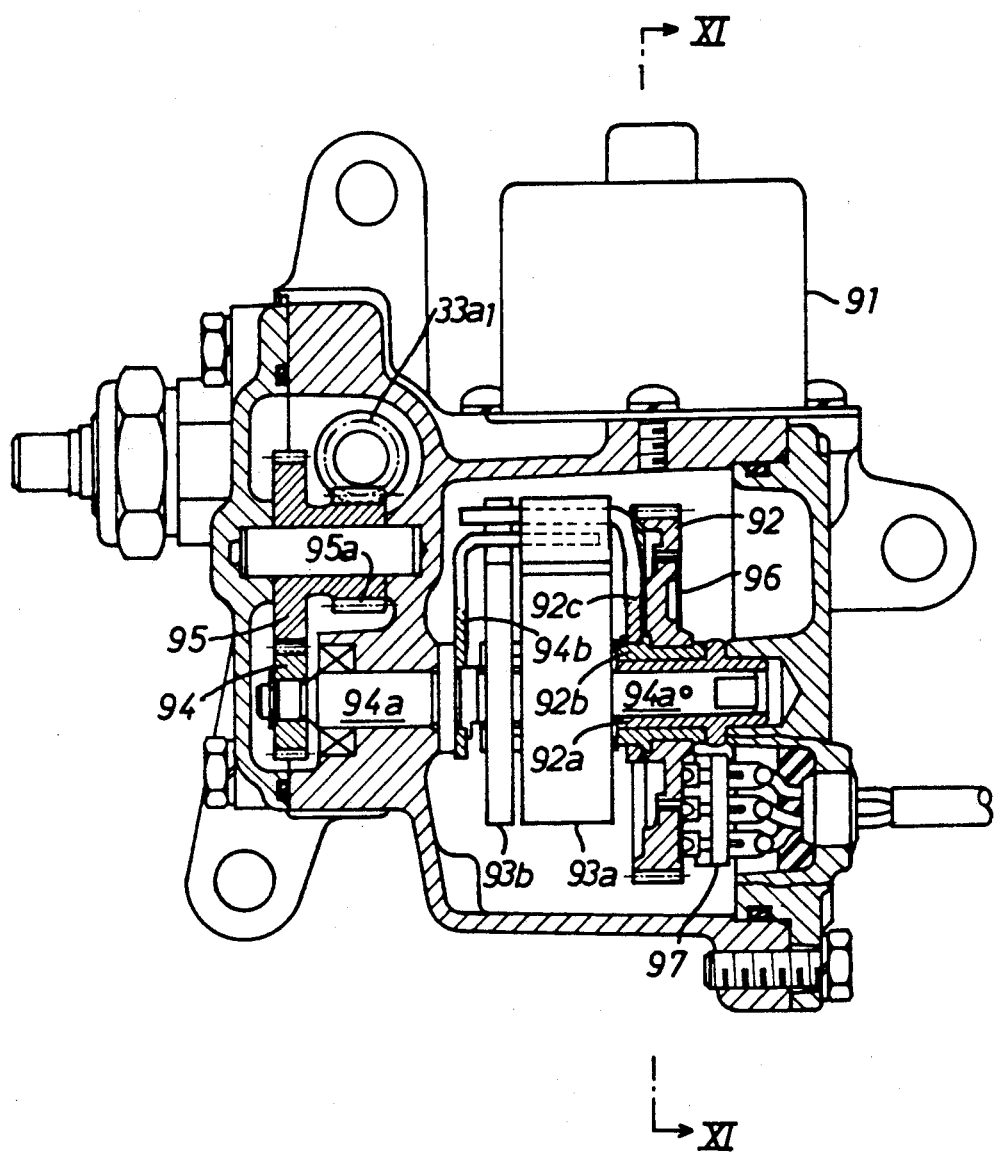
FIG. 10 is a cross-sectional view taken along line X—X in FIG. 9.
Figure 11:
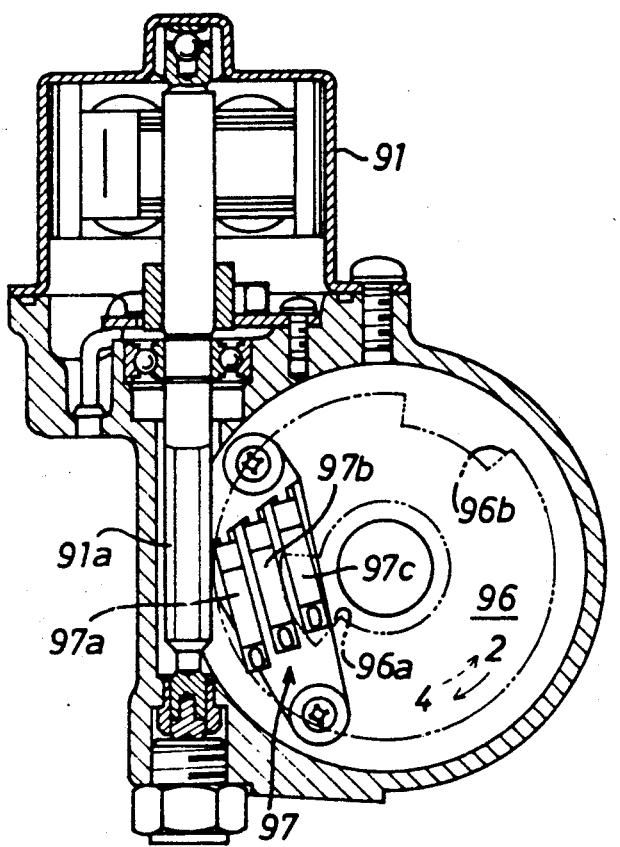
FIG. 11 is a cross-sectional view taken along line XI—XI in FIG. 10.

As shown in FIG. 11, the electric motor 91 is mounted to the transfer housing and has an output shaft 91a integrally formed with a worm 91a which is in mesh with a wheel 92 of insulation material shown in FIG. 10. As shown in FIG. 10, the wheel 92 is mounted on a hollow rotary shaft 92a for rotation therewith. The rotary shaft 92a is coaxially arranged to a rotary shaft 94a through first and second spiral springs 93a and 93b. The rotary shafts 92a and 94a are rotatably mounted within the transfer housing, and the rotary shaft 92a is rotatably coupled over the rotary shaft 94a for relative rotation. The spiral springs 93a and 93b are wound around the rotary shaft 94a relatively in opposite directions and fixed at their inner ends to the rotary shaft 94a. The spiral springs 93a, 93b are preloaded relatively in opposite directions by engagement with an arm 94b fixed to the rotary shaft 94a at their outer ends. The outer ends of spiral springs 93a, 93b are further engaged with an arm 92c fixed to the hub member 92b of wheel 92 to be moved by rotation of the wheel 92 relatively in opposite directions. A first gear 94 is mounted on the outer end of rotary shaft 94a for rotation therewith and meshed with a second gear 95 which is rotatably mounted on the transfer housing. The second gear 95 is integrally formed with a pinion 95a which is meshed with a rack portion 33a₁ of fork shaft 33a.

Figure 9:
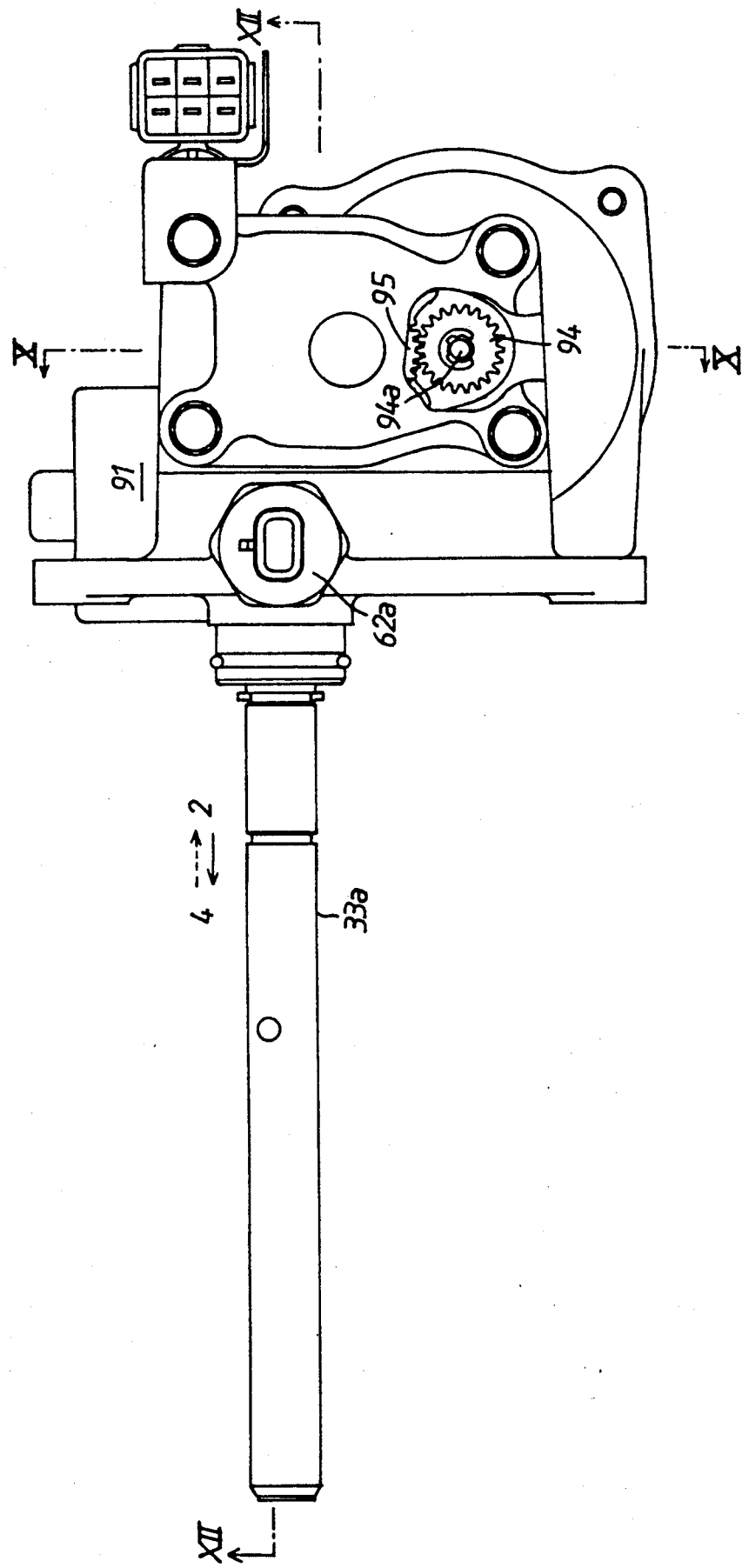
FIG. 9 is an enlarged elevation of an electric motor and a fork shaft shown in FIG. 8.
Figure 12:
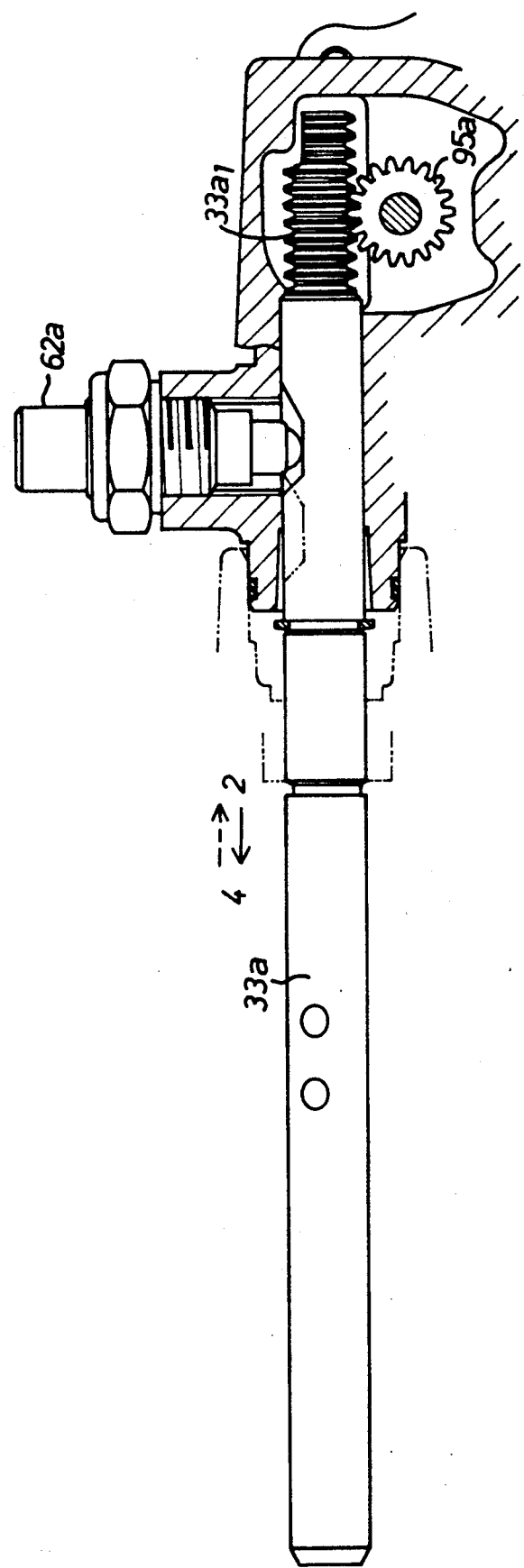
FIG. 12 is a cross-sectional view taken along line XII—XII in FIG. 9.

As shown in FIGS. 10 and 11, the wheel 92 is covered with a circular insulation plate 96 attached thereto. The circular insulation plate 96 is formed at its inner periphery with a semi-circular recess 96a and at its outer periphery with a semi-circular recess 96b. A detection switch assembly 97 is mounted within the transfer housing in such a manner as to face the circular insulation plate 96. The detection switch assembly 97 includes three contacts 97a, 97b, 97c which are slidably in contact with the circular insulation plate 96 to detect rotation of the wheel 92. When engaged with the recess 96a of insulation plate 96, the contact 97c becomes conductive and the other contacts 97a, 97b become non-conductive. When engaged with the recess 96b of insulation plate 96, the contact 97a becomes conductive and the other contacts 97b, 97c become non-conductive. As shown in FIGS. 9 and 12, a detection switch 62a is mounted on the transfer housing to detect movement of the fork shaft 33a thereby to detect the mode of operation of the transfer device 20.

Figure 13:
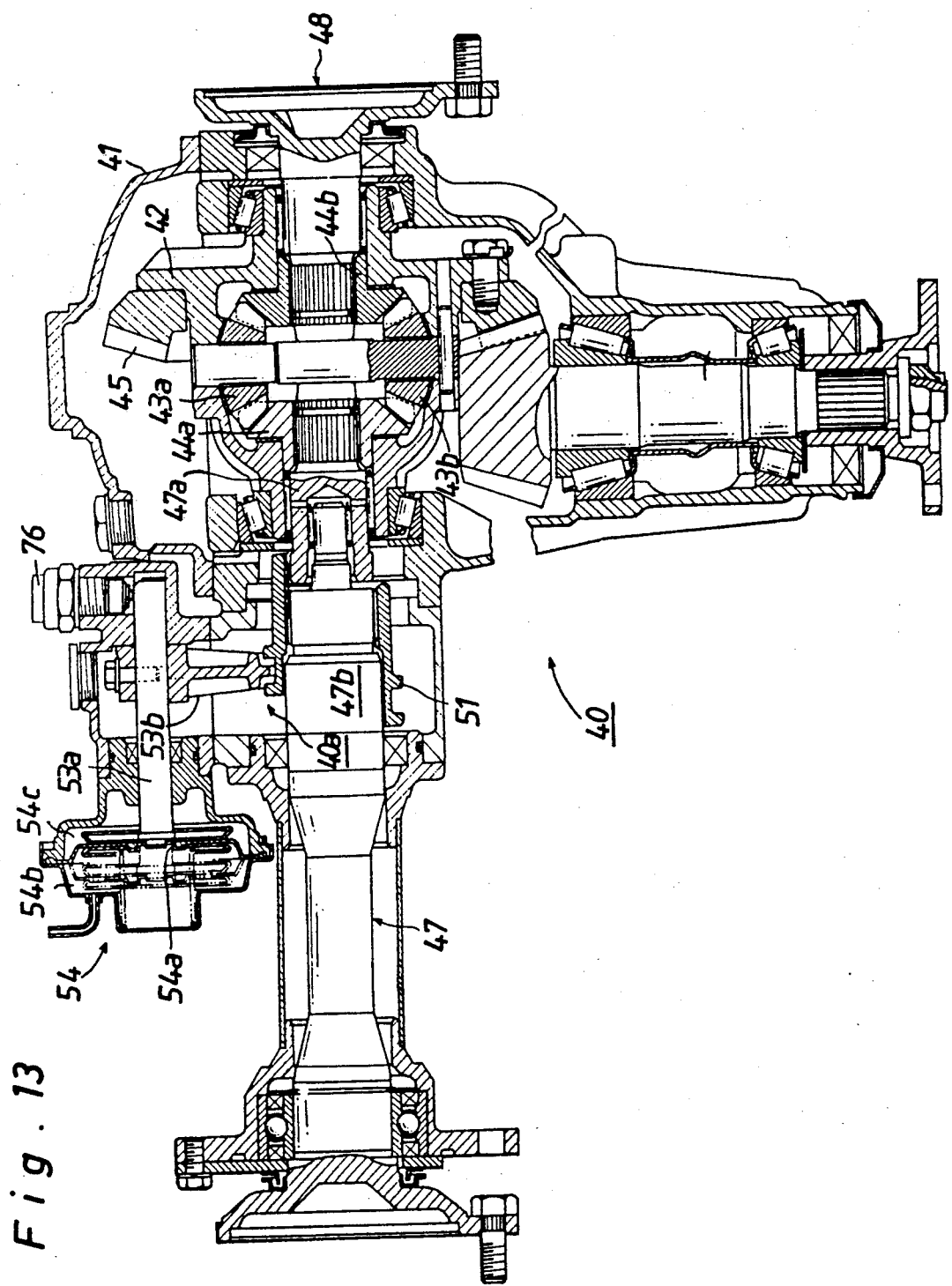
FIG. 13 is a full sectional view of a practical embodiment of the front differential schematically shown in FIG. 2.

In FIG. 13 there is illustrated a practical embodiment of the front differential 40 shown in FIG. 2, wherein the same component parts and portions as those shown in FIG. 2 are indicated by the same reference numerals. In this embodiment, the right-hand drive shaft 48 is connected at its inner end to the right-hand side gear 44b for rotation therewith. In a condition where the clutch sleeve 51 is retained in the first position to disconnect the outer shaft 47b from the inner shaft 47a, the right-hand side gear 44b is rotated by the torque applied thereto from the right-hand road wheel through the drive shaft 48. This causes the pinions 43a, 43b, side gear 44a and inner shaft 47a to rotate with the side gear 44. In this instance, the differential case 42 and drive pinion shaft 46 are maintained still.

Figure 14:
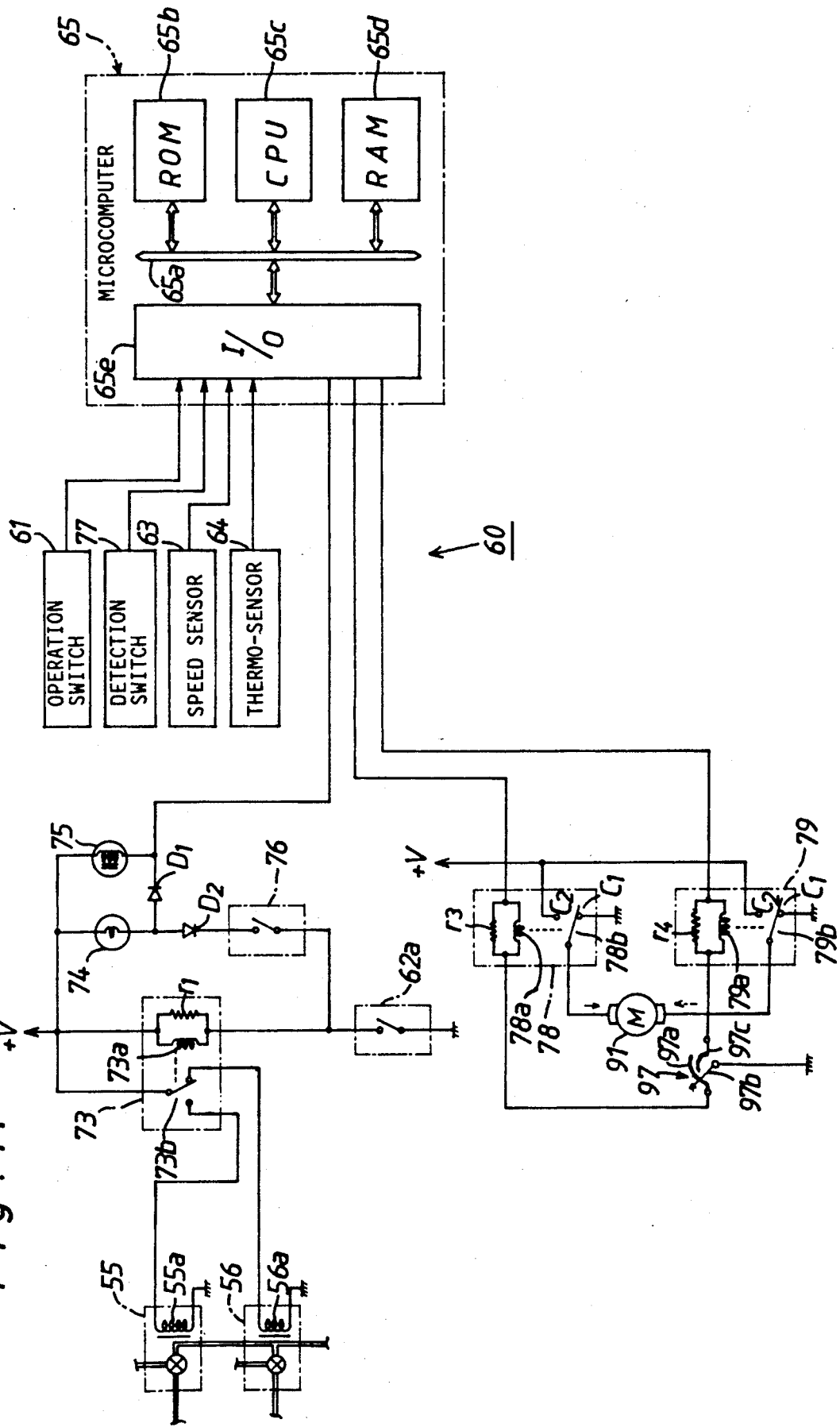
FIG. 14 is a block diagram of an electric control apparatus modified for the transfer device and front differential shown in FIGS. 8 and 13.

In FIG. 14 there is illustrated an electric control apparatus for the transfer device 20 and front differential 40 described above, wherein the same components as those shown in FIG. 6 are indicated by the same reference numerals and characters. In this electric control apparatus, the ROM 65b is arranged to memorize a program represented by a flow chart shown in FIGS. 15(A) and 15(B), and the I/O 65e is connected to a detection switch 77 which is associated with the planetary gear unit 80 as shown in FIG. 8 to detect movement of the fork shaft 87a. The detection switch 77 is arranged to be turned on when the fork shaft 87a is retained in a first position to establish a high speed power train at the planetary gear unit 80 and to be turned off when the fork shaft 87a has been shifted rightward to a second position from the first position to establish a low speed power train at the planetary gear unit 80.

The I/O 65e of computer 65 is connected to a motor control circuit which is substituted for the relay control circuit 66 and relay circuit 72 shown in FIG. 6. The motor control circuit includes a pair of relay circuits 78 and 79. The relay circuit 78 includes a relay coil 78a connected in parallel with a resistor r₃ and connected at its one end to the I/O 65e. Similarly, the relay circuit 79 includes a relay coil 79a connected in parallel with a resistor r₄ and connected at its one end to the I/O 65e. The relay coils 78a, 79a are connected at their other ends to the contacts 97a, 97c of detection switch assembly 97 shown in FIGS. 10 and 11. The contact 97b is in the form of a movable contact grounded at its one end. The relay circuit 78 is provided with a relay switch 78b the movable contact of which is connected to an input terminal of electric motor 91 shown in FIG. 8, while the relay circuit 79 is provided with a relay switch 79b the movable contact of which is connected to another input terminal of electric motor 91. The movable contacts of relay switches 78b, 79b are arranged to be engaged with fixed contacts C₁ during deenergization of the relay coils 78a, 79a and to be engaged with fixed contacts C₂ during energization of the relay coils 78a, 79a. The fixed contacts C₁ are grounded at their one ends, while the fixed contacts C₂ are connected to the electric power source. In the above arrangement, the electric motor 91 is in the form of a reversible D.C. motor.

Figure 15A:
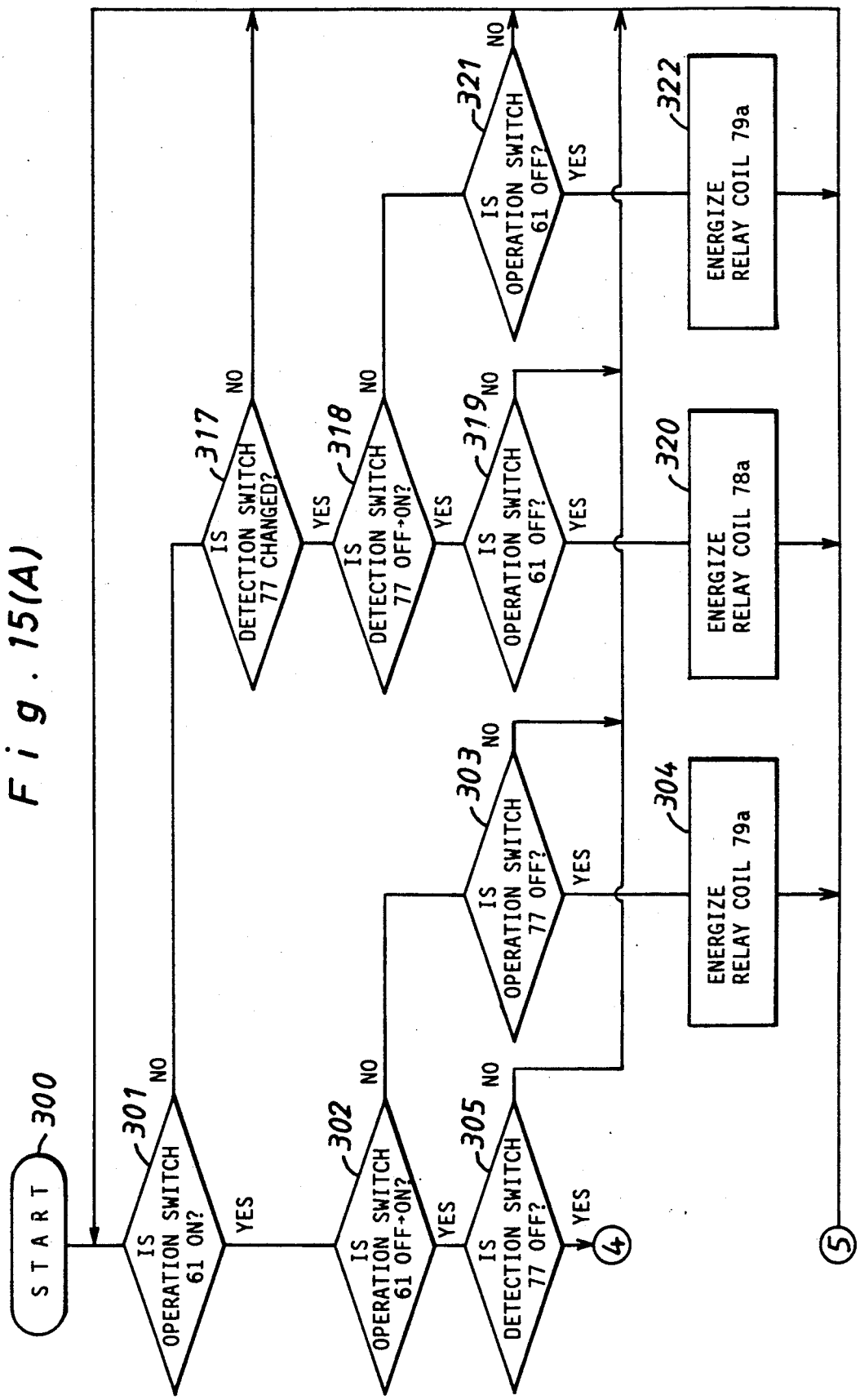

Hereinafter, the operation of the electric control apparatus shown in FIG. 14 will be described in detail with reference to the flow chart of FIGS. 15(A) and 15(B). When the ignition switch is maintained in its open position, the transfer device 20 and front differential 40 are each maintained in a condition defined by the prior mode of operation. In such a condition, a speed reduction mechanism composed of the worm 91a and wheel 92 acts to retain the transfer device 20 in the prior mode of operation, and the detection switch 62a is also retained in a position defined by the prior mode of operation. When the ignition switch is closed to start the engine 11, the electric control apparatus is activated by supply of the electric power, and in turn, the CPU 65c of computer 65 starts to execute the program at step 300 in the flow chart of FIG. 15. When the program proceeds to step 301, the CPU 65c determines as to whether the operation switch 61 has been operated or not. If the answer is "No" at step 301, the CPU 65c causes the program to proceed to step 317 for execution at the following steps 318-322.

If the answer is "Yes" at step 301, the program proceeds to step 302 where the CPU 65c determines as to whether or not the operation switch 61 has been switched over from its open position (for selection of the two-wheel drive mode) to its closed position (for selection of the four-wheel drive mode). If the answer is "No" at step 302, the program proceeds to step 303 where the CPU 65c determines as to whether the detection switch 77 is turned off or not. When the planetary gear unit 80 is conditioned to provide the low speed power train, the CPU 65c determines a "No" answer at step 303 and causes the program to return to step 301. When the planetary gear unit 80 is conditioned to provide the high speed power train, the CPU 65c determines a "Yes" answer at step 303 and causes the program to proceed to step 304 where the CPU 65c produces a command signal for energizing the relay coil 79a and returns the program to step 301. When applied with the command signal from the CPU 65c, the I/O 65e acts to apply the source voltage to the relay coil 79a for a predetermined period of time (for instance, 5 seconds). In this instance, the contact 97b of detection switch 97 is previously maintained in engagement with the contact 97c through the recess 96b of plate 96 to energize the relay coil 79a. Thus, the movable contact of relay switch 79b is engaged with the fixed contact $C_2$ to permit an electric current flowing therethrough to the electric motor 91 as shown by a broken arrow in the figure. This causes the electric motor 91 to rotate in a reverse direction. In turn, the wheel 92 is driven by the electric motor 91 through worm 91a to rotate the plate 96 in a direction shown by a broken arrow in FIG. 11.

When the recess 96a of plate 96 is positioned to face the detection switch 97, the contact 97b is disengaged from the contact 97c to deenergize the relay coil 79a, and in turn, the movable contact of relay switch 79b is engaged with the fixed contact $C_1$ to deactivate the electric motor 91. In such a condition, the contact 97b of detection switch 97 is brought into engagement with the contact 97a. On the other hand, rotation of the wheel 92 is transmitted to the pinion 95a through the spiral spring 93a (or 93b) and gears 94, 95 to displace the fork shaft 33a in a direction shown by a broken arrow in FIGS. 9 and 12. In turn, the clutch sleeve 32 is displaced rightward in FIG. 8 to release drive connection between the output shafts 22 and 23, and the detection switch 62a is turned off by rightward displacement of the fork shaft 33a. Simultaneously, the clutch sleeve 51 in front differential 40 is moved from the second position to the first position to disconnect the outer shaft 47b from the inner shaft 47a in the same manner as described above. As a result, the mode of operation of the vehicle is switched over from the high speed four-wheel drive mode to the high speed two-wheel drive mode, and the indication lamp 74 is put out.

When the operation switch 61 has been switched over from its open position for selection of the two-wheel drive mode to its closed position for selection of the four-wheel drive mode during execution of the program at step 302, the CPU 65c determines a "Yes" answer at step 302 and causes the program to proceed to step 305 where the CPU 65c determines as to whether the detection switch 77 is turned off or not. When the planetary gear unit 80 is conditioned to provide the low speed power train, the detection switch 77 is turned on. In such a condition, the CPU 65c determines a "No" answer at step 305 and returns the program to step 301. As a result, the mode of operation of the vehicle is maintained in the low speed four-wheel drive mode L4.

When the planetary gear unit 80 is conditioned to provide the high speed power train during execution of the program at step 305, the detection switch 77 is turned off. In such a condition, the CPU 65c determines a "Yes" answer at step 305 and causes the program to proceed to step 306 for execution of the program at steps 306-309 in the same manner as described above. If travel speed of the vehicle and temperature of the lubricating oil in front differential 40 are in the allowable region A during execution of the program at step 309, the CPU 65c determines a "Yes" answer and causes the program to proceed to step 310 where the CPU 65c produces a command signal for energizing the relay coil 78a and returns the program to step 301. When applied with the command signal, the I/O 65e acts to energize the relay coil 78a for the predetermined period of time. In this instance, the the contact 97b of detection switch 97 is previously maintained in engagement with the contact 97a through the recess 96a of plate 96 to energize the relay 78a, and in turn, the movable contact of relay switch 78b is engaged with the fixed contact $C_2$ to permit the electric current flowing therethrough to the electric motor 91 in a direction shown by a solid arrow in FIG. 14. Thus, the electric motor 91 is activated to rotate in a forward direction, and in turn, the wheel 92 is driven by the electric motor 91 through worm 91a to rotate the plate 96 in a direction shown by a solid arrow in FIG. 11.

When the recess 96b of plate 96 is positioned to face the detection switch 97, the contact 97b is disengaged from the contact 97a to deenergize the relay coil 78a, and in turn, the movable contact of relay switch 78b is engaged with the fixed contact $C_1$ to deactivate the electric motor 91. In such a condition, the contact 97b of detection switch 97 is brought into engagement with the contact 97c. On the other hand, rotation of the wheel 92 is transmitted to the pinion 95a through the spiral spring 93b (or 93a) and gears 94, 95 to displace the fork shaft 33a in a direction shown by a solid arrow in FIGS. 9 and 12. In turn, the clutch sleeve 32 is displaced leftward in FIG. 8 to establish drive connection between the output shafts 22 and 23, and the detection switch 62a is turned on by leftward displacement of the fork shaft 33a. Simultaneously, the clutch sleeve 51 in front differential 40 is moved from the first position to the second position to establish drive connection between the inner and outer shafts 47a and 47b in the same manner as described above. As a result, the mode of operation of the vehicle is switched over from the high speed two-wheel drive mode H2 to the high speed four-wheel drive mode H4, and the indication lamp 74 is lighted.

If the CPU 65c determines a "No" answer during execution of the program at step 309, the program proceeds to step 311 where the CPU 65c produces a command signal for intermittently energizing the indication lamp 74 and for energizing the buzzer 75. When applied with the command singal, the I/O 65e acts to alternately switch over the voltage applied to the indication lamp 74 and buzzer 75 between the source voltage $+V$ and ground voltage. Thus, the indication lamp 74 is intermittently lighted, and the buzzer 75 issues alarm sounds therefrom to inform the drive of the fact that the four-wheel drive mode may not be selected at the transfer device 20. After execution at step 311, the program proceeds to step 312 where the CPU 65c determines as to whether the operation switch 61 has been returned to its open position or not. When the operation switch 61 is returned to its open position for selection of the two-wheel drive mode, the CPU 65c determines a "Yes" answer at step 312 and causes the program to proceed to step 314 where the CPU 65c produces a command signal for deenergizing the indication lamp 74 and buzzer 75 and applies it to the I/O 65e. When applied with the command signal, the I/O 65e acts to make the connection point between buzzer and diode $D_1$ in a open condition. In turn, the indication lamp 74 and buzzer are deenergized, and the program returns to step 301.

When the planetary gear unit 80 is switched over by operation of the manual lever 81 to provide the low speed power train during execution of the program at step 312, the detection switch 77 is turned on. In this instance, the CPU 65c determines a "Yes" answer at step 313 and causes the program to proceed to step 315 where the CPU 65c produces a command signal for deenergizing the indication lamp 74 and buzzer 75 and applies it to the I/O 65e. As a result, the indication lamp 74 and buzzer 75 are deenergized under control of the I/O 65e in the same manner as described above, and the program proceeds to step 316. At step 316, the CPU 65c produces a control signal for energizing the relay coil 78a for the predetermined period of time and returns the program to step 301. The execution at step 316 is the same as that at step 310. Thus, the mode of operation of the vehicle is switched over from the high speed two-wheel drive mode H2 to the low speed four-wheel drive mode L4.

In the part-time four-wheel drive system of the vehicle, the manual lever 81 is adapted to selectively provide the high speed two-wheel drive mode H2, the high speed four-wheel drive mode H4 and the low speed four-wheel drive mode L4. Assuming that the detection switch 77 is maintained in a position defined by the prior mode of operation, the CPU 65c determines a "No" answer at steps 301 and 317 to repeat the execution at steps 301 and 317. When the planetary gear unit 80 is switched over by operation of the manual lever 81 to provide the low speed power train in a condition where the operation switch 61 is maintained in its open position to select the two-wheel drive mode at the transfer device 20, the detection switch 77 is turned on. In this instance, the CPU 65c determines a "Yes" answer respectively at steps 317, 318 and 319 and causes the program to proceed to step 320 where the CPU 65c produces a command signal for energizing the relay coil 78a. In turn, the relay coil 78a is energized under control of the I/O 65e to cause rightward movement of the fork shaft 33a in the same manner as that at step 310. As a result, the mode of operation of the vehicle is switched over from the high speed two-wheel drive mode H2 to the low speed four-wheel drive mode.

When the planetary gear unit 80 is switched over by operation of the manual lever 81 to provide the low speed power train in a condition where the operation switch 61 is maintained in its closed position to select the four-wheel drive mode at the transfer device 20, the detection switch 77 is turned on. In this instance, the CPU 65c determines a "Yes" answer respectively at steps 317 and 318 and determines a "No" answer at step 319 to return the program to step 301. Thus, the mode of operation of the vehicle is switched over from the high speed four-wheel drive mode H4 to the low speed four-wheel drive mode L4. When the planetary gear unit 80 is switched over by operation of the manual lever 81 to provide the high speed power train in a condition where the operation switch 61 is maintained in its closed position to select the four-wheel drive mode at the transfer device 20, the detection switch 77 is turned off. In this instance, the CPU 65c determines a "Yes" answer at step 317 and determines a "No" answer at step 318. Thus, the program proceeds to step 321 where the CPU 65c determines as to whether or not the operation switch 61 is maintained in its open position for selection of the two-wheel drive mode. If the answer is "Yes" at step 321, the program proceeds to step 322 where the CPU produces a command signal for energizing the relay coil 79a, and in turn, the relay coil 79a is energized under control of the I/O 65e to cause leftward movement of the fork shaft 33a in the same manner as that at step 304. As a result, the mode of operation of the vehicle is switched over from the low speed four-wheel drive mode L4 to the high speed two-wheel drive mode H2. If the answer is "No" at step 321, the program returns to step 301. In this instance, the mode of operation of the vehicle is switched over from the low speed four-wheel drive mode L4 to the high speed four-wheel drive mode H4.

Although the above embodiments have been adapted to a part-time four-wheel drive vehicle the rear road wheels of which are continuously driven, it is apparent that the present invention can be adapted to a part-time four-wheel drive vehicle the front road wheels of which are continuously driven.

Having now fully set forth certain preferred embodiments of the concept underlying the present invention, various other applications and embodiments as well as certain modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control apparatus for a part-time four-wheel drive vehicle having a transfer device drivingly connected to a prime mover of the vehicle to continuously transfer the power from said prime mover to a first set of road wheels, said transfer device including a first clutch mechanism arranged to transfer the power to a second set of road wheels when it has been engaged, a differential drivingly connected at its output side to said second set of road wheels and at its input side to said transfer device, said differential including a second clutch mechanism arranged to transmit the power from said transfer device to said second set of road wheels when it has been engaged, a first actuator assembled with said transfer device to engage said first clutch mechanism when it has been operated in one direction and to disengage said first clutch mechanism when it has been operated in the opposite direction, and a second actuator assembled with said differential to engage said second clutch mechanism when it has been operated in one direction and to disengage said second clutch mechanism when it has been operated in the opposite direction, the electric control apparatus comprising:
a manual operation switch for selecting a two-wheel drive mode or a four-wheel drive mode at said transfer device;
a speed sensor for detecting travel speed of the vehicle to produce a speed signal indicative of the travel speed of the vehicle;
a temperature sensor for detecting temperature of lubricating oil in said differential to produce a temperature signal indicative of the oil temperature; and
control means responsive to said speed and temperature signals for operating said first and second actuators respectively in the one direction when said manual operation switch has been operated to select the four-wheel drive mode at said transfer device in a condition where the travel speed and oil temperature are in a predetermined allowable region during travel of the vehicle in the two-wheel drive mode and for rendering said first and second actuators inoperative when said manual operation switch has been operated to select the four-wheel drive mode in a condition where the travel speed and oil temperature are out of the predetermined allowable region.

2. An electric control apparatus for a part-time four-wheel drive vehicle having a transfer device drivingly connected to a prime mover of the vehicle to continuously transfer the power from said prime mover to a first set of road wheels, said transfer device including a first clutch mechanism arranged to transfer the power to a second set of road wheels when it has been engaged, a differential drivingly connected at its output side to said second set of road wheels and at its input side to said transfer device, said differential including a second clutch mechanism arranged to transmit the power from said transfer device said second set of road wheels when it has been engaged, a first actuator assembled with said transfer device to engage said first clutch mechanism when it has been operated in one direction and to disengage said first clutch mechanism when it has been operated in the opposite direction, and a second actuator assembled with said differential to engage said second clutch mechanism when it has been operated in one direction and to disengage said second clutch mechanism when it has been operated in the opposite direction, the electric control apparatus comprising:

a manual operation switch for selecting a two-wheel drive mode or a four-wheel drive mode at said transfer device;

a detection means provided on said transfer device to be operated when the four-wheel drive mode has been selected at said transfer device;

a speed sensor for detecting travel speed of the vehicle to produce a speed signal indicative of the travel speed of the vehicle;

a temperature sensor for detecting temperature of lubricating oil in said differential to produce a temperature signal indicative of the oil temperature;

control means of responsive to said speed and temperature signals for operating said first actuator in the one direction when said manual operation switch has been manipulated to select the four-wheel drive mode at said transfer device in a condition where the travel speed and oil temperature are in a predetermined allowable region during travel of the vehicle in the two-wheel drive mode and for rendering said first actuator inoperative when said manual operation switch has been manipulated to select the four-wheel drive mode in a condition where the travel speed and oil temperature are out of the predetermined allowable region; and means for operating said second actuator in the one direction in response to operation of said detection means.

3. An electric control apparatus as claimed in claim 1 or 2, wherein the predetemined allowable region permits engagement of said first clutch mechanism during travel of the vehicle in the two-wheel drive mode.

4. An electric control apparatus as claimed in claim 1, further comprising indication means for visually informing the driver of the fact that said first and second actuators have been rendered inoperative under control of said control means.

5. An electric control apparatus as claimed in claim 4, wherein said indication means includes an indication lamp mounted on an instrument panel of the vehicle and means for continuously energizing said lamp when the four-wheel drive mode has been selected at said transfer device by operation of said first actuator and for intermittently energizing said lamp when said first and second actuators have been rendered inoperative.

6. An electric control apparatus as claimed in claim 1, wherein said transfer device includes a change-speed mechanism arranged to selectively provide low and high speed power trains for transfer of the power to said first and second sets of road wheels and means associated with said change-speed mechanism to produce a low speed signal therefrom when said change-speed mechanism is conditioned to provide the low speed power train and to produce a high speed signal therefrom when said change-speed mechanism is conditioned to provide the high speed power train, and wherein said control means is further responsive to said high speed signal for operating said first and second actuators respectively in the one direction when said manual operation switch has been manipulated to select the four-wheel drive mode in a condition where said change-speed mechanism is conditioned to provide the high speed power train and where the travel speed and oil temperature are in the predetermined allowable region during travel of the vehicle in the two-wheel drive mode.

* * * * *